US012625368B2

(12) United States Patent
Anzai et al.

(10) Patent No.: US 12,625,368 B2
(45) Date of Patent: May 12, 2026

(54) HEAD-UP DISPLAY SYSTEM AND TRANSPORTATION MACHINE

(71) Applicant: FUJIFILM Corporation, Tokyo (JP)

(72) Inventors: Akihiro Anzai, Minamiashigara (JP); Eiichiro Aminaka, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 311 days.

(21) Appl. No.: 18/581,554

(22) Filed: Feb. 20, 2024

(65) Prior Publication Data

US 2024/0210687 A1 Jun. 27, 2024

Related U.S. Application Data

(63) Continuation of application No. PCT/JP2022/035856, filed on Sep. 27, 2022.

(30) Foreign Application Priority Data

Sep. 30, 2021 (JP) ................................ 2021-162101

(51) Int. Cl.
*G02B 27/01* (2006.01)
*B60K 35/23* (2024.01)
*G02B 5/30* (2006.01)

(52) U.S. Cl.
CPC .......... *G02B 27/0101* (2013.01); *B60K 35/23* (2024.01); *G02B 5/3016* (2013.01); *B60K 2360/23* (2024.01); *B60K 2360/25* (2024.01)

(58) Field of Classification Search
CPC ........ G02B 27/0101; G02B 2027/0112; B60K 35/23; B60K 35/00; B60K 2360/23;
(Continued)

(56) References Cited

U.S. PATENT DOCUMENTS

2011/0128602 A1 * 6/2011 Hamano .............. H04N 9/3173 359/205.1
2012/0019923 A1 1/2012 Niesten
(Continued)

FOREIGN PATENT DOCUMENTS

JP 2013-200474 A 10/2013
JP 2018-81296 A 5/2018
(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2022/035856, dated Apr. 11, 2024.
(Continued)

*Primary Examiner* — William R Alexander
(74) *Attorney, Agent, or Firm* — Birch, Stewart, Kolasch & Birch, LLP

(57) ABSTRACT

Provided is a head-up display system and a transportation machine including the head-up display system, the head-up display system including a windshield glass having a selective reflection layer and a projector including laser light sources of three colors of blue light, green light, and red light for forming a projection image on the windshield glass, in which the selective reflection layer includes the following selective reflection central wavelengths $\lambda_B$, $\lambda_G$, and $\lambda_R$ at a light incidence angle of 60°, $$400\ \text{nm} \leq \lambda_B < 500\ \text{nm}$$

$$500\ \text{nm} \leq \lambda_G < 600\ \text{nm}$$

$$600\ \text{nm} \leq \lambda_R < 700\ \text{nm}$$

(Continued)

all of $X_B/X_G$, $X_B/X_R$, and $X_G/X_R$ are in a range of 0.80 to 1.20.

In the above, $X_B=R_B \times L_B$, $X_G=R_G \times L_G$, and $X_R=R_R \times L_R$. $R_B$, $R_G$, and $R_R$ indicate a natural light reflectivity at $\lambda_B$, $\lambda_G$, and $\lambda_R$, and $L_B$, $L_G$, and $L_R$ indicate the brightness of blue, green, and red laser beam emitted from the projector.

10 Claims, 4 Drawing Sheets

(58) Field of Classification Search
CPC . B60K 2360/25; B32B 1/00; B32B 2307/412; B32B 2307/416; B32B 2457/20; B32B 2605/08
USPC .................................. 359/630, 13, 29; 345/8
See application file for complete search history.

(56) References Cited

U.S. PATENT DOCUMENTS

| | | | | |
|---|---|---|---|---|
| 2015/0009550 | A1 | 1/2015 | Misago et al. | |
| 2016/0139416 | A1* | 5/2016 | Yamakawa | G02B 26/101 359/634 |
| 2017/0052369 | A1* | 2/2017 | Shimatani | G02B 27/286 |
| 2017/0099469 | A1* | 4/2017 | Matsumoto | H01S 5/4093 |
| 2017/0154406 | A1* | 6/2017 | Atsuumi | G02B 26/105 |
| 2017/0201068 | A1* | 7/2017 | Furuya | H01S 5/4093 |
| 2017/0235140 | A1* | 8/2017 | Kusanagi | H04N 5/30 345/7 |
| 2017/0351134 | A1* | 12/2017 | Shimatani | G02B 5/3083 |
| 2018/0067308 | A1* | 3/2018 | Sakai | H04N 9/3155 |
| 2019/0018239 | A1* | 1/2019 | Kurozuka | B60K 35/60 |
| 2019/0097396 | A1* | 3/2019 | Sakai | G02B 26/0833 |
| 2019/0156454 | A1* | 5/2019 | Atsuumi | G02B 26/105 |
| 2019/0235243 | A1 | 8/2019 | Anzai et al. | |
| 2020/0150429 | A1* | 5/2020 | Hong | G02F 1/0136 |
| 2020/0326539 | A1* | 10/2020 | Ando et al. | G02B 27/286 |
| 2020/0355915 | A1* | 11/2020 | Tsukuda | H04N 9/3164 |
| 2021/0257814 | A1* | 8/2021 | Enya | H01S 5/4093 |
| 2022/0221718 | A1 | 7/2022 | Anzai | |
| 2022/0357494 | A1 | 11/2022 | Takahashi | |
| 2024/0004193 | A1* | 1/2024 | Li | G02B 5/223 |
| 2024/0118541 | A1* | 4/2024 | Li | G02B 5/223 |

FOREIGN PATENT DOCUMENTS

| | | | |
|---|---|---|---|
| JP | 2019/59904 | A | 4/2019 |
| WO | WO 2019/146423 | A1 | 8/2019 |
| WO | WO 2021/060402 | A1 | 4/2021 |
| WO | WO 2021/153763 | A1 | 8/2021 |

OTHER PUBLICATIONS

International Search Report (Form PCT/ISA/210) for International Application No. PCT/JP2022/035856, dated Nov. 8, 2022, with English translation.

Extended European Search Report for corresponding European Application No. 22876190.4, dated Jan. 9, 2025.

* cited by examiner

HEAD-UP DISPLAY SYSTEM AND TRANSPORTATION MACHINE

CROSS-REFERENCE TO RELATED APPLICATIONS

This application is a Continuation of PCT International Application No. PCT/JP2022/035856 filed on Sep. 27, 2022, which claims priority under 35 U.S.C. § 119 (a) to Japanese Patent Application No. 2021-162101 filed in Japan on Sep. 30, 2021. Each of the above applications is hereby expressly incorporated by reference, in its entirety, into the present application.

BACKGROUND OF THE INVENTION

1. Field of the Invention

The present invention relates to a head-up display system and a transportation machine.

2. Description of the Related Art

Recently, it is known as a so-called head-up display or head-up display system for providing various pieces of information such as maps, traveling speed, or vehicle conditions to a driver or the like by projecting images on a windshield glass of a vehicle or other moving objects.

By using the head-up display system, drivers or other subjects observe virtual images of images that are projected on the windshield glass and that include the above described various pieces of information. A virtual image formation position is positioned on the driver's field of the vehicle outer side of the windshield glass. The virtual image formation position is usually positioned at the driver's field more than 1000 mm away from the windshield glass, and the outer side of the windshield glass. Therefore, the driver can obtain the above described various pieces of information while looking at the outer side in driver's field without significantly moving his/her line of sight. Thus, in a case of using the head-up display system, it is expected to drive more safely while obtaining various pieces of information.

In a head-up display system, in order to reduce a double image generated by reflection of projection light on a front surface and a rear surface of a windshield glass, a technique of using a curved windshield for a vehicle formed of laminated glass having a wedge-shaped cross-sectional shape is known. In addition, studies have been made on a technique in which P-polarized light is made incident on a glass surface to utilize the Brewster's angle, and reflected light from the glass surface is made close to zero.

For example, JP2018-81296A describes a windshield glass including a λ/2 retardation layer and four or more cholesteric liquid crystal reflective layers having different central wavelengths of selective reflection. According to the description of JP2018-81296A, by including a cholesteric liquid crystal layer having a central wavelength of selective reflection at 350 nm or more and less than 490 nm as one layer of the cholesteric liquid crystal reflection layers, it is possible to provide a windshield glass in which appearance tint in a direction perpendicular to the windshield glass is transparent and appearance is not impaired even under external light.

SUMMARY OF THE INVENTION

In a head-up display in which a P-polarized light reflection film is incorporated into a windshield glass, it is required that the appearance tint is transparent (white light appears white) even in a case of being viewed from various angles from the viewpoint of the clearness and designability of a display image in addition to the legal regulation that the transmittance is set to 70% or more. In order to realize this, it is considered that a laser having a narrow band of a luminescence wavelength is used as a light source of the imager, and a selective reflection layer having a narrow half-width of each reflected light and a high reflectivity is used as the reflection layer of the P-polarized light reflection film described in Examples of JP2018-81296A. It is considered that by using such a light source of an imager and the selective reflection layer in combination, the imager light can be efficiently reflected, and the brightness of the image (clearness of the display image) can be increased while maintaining the transmittance high.

However, as a result of repeated studies by the present inventors, it has been found that, in the windshield glass described in JP2018-81296A, in a case where the reflectivity is set such that the appearance tint becomes transparent, there is a problem in that the tint of a display image (hereinafter, referred to as "image tint") becomes red.

An object of the present invention is to provide a head-up display system that is a head-up display including a laser light source for forming a projection image and a windshield glass and that has a neutral image tint, and a transportation machine including the head-up display.

As a result of intensive examination conducted by the present inventors in view of the above-described problems, it was found that the above-described problems can be solved by controlling a balance between reflectivity of blue light, green light, and red light of a selective reflection layer in a windshield glass and luminescence intensity (brightness) of laser beam of three colors of blue light, green light, and red light in a laser light source to satisfy a specific regulation, thereby leading to the present invention.

That is, the object of the present invention has been achieved by the following means.

[1]

A head-up display system comprising, a windshield glass having a selective reflection layer, and a projector including a laser light source for forming a projection image on the windshield glass, in which the selective reflection layer includes three wavelengths of $\lambda_B$, $\lambda_G$, and $\lambda_R$ as selective reflection central wavelengths at a light incidence angle of 60°, $$400\text{ nm} \le \lambda_B < 500\text{ nm}$$

$$500\text{ nm} \le \lambda_G < 600\text{ nm}$$

$$600\text{ nm} \le \lambda_R < 700\text{ nm}$$

the laser light source emits laser beam of three colors of blue light, green light, and red light, and all of the following regulations (a) to (c) are satisfied, regulation (a) $0.80 \le X_B/X_G \le 1.20$ regulation (b) $0.80 \le X_B/X_R \le 1.20$ regulation (c) $0.80 \le X_G/X_R \le 1.20$ in the regulations, $X_B = R_B \times L_B$, $X_G = R_G \times L_G$, and $X_R = R_R \times L_R$, $R_B$ indicates a natural light reflectivity of the selective reflection layer at $\lambda_B$, $R_G$ indicates a natural light reflectivity of the selective reflection layer at $\lambda_G$, and $R_R$ indicates a natural light reflectivity of the selective reflection layer at $\lambda_R$, and $L_B$ represents brightness of blue laser beam in light emitted from the projector, $L_G$ represents brightness of green laser beam in the light emitted from the projector, and $L_R$ represents brightness of red laser beam in the light emitted from the projector.

[2]

The head-up display system according to [1], in which all of the following regulations (a1) to (c1) are satisfied, regulation (a1) $0.90 \leq X_B/X_G \leq 1.10$ regulation (b1) $0.90 \leq X_B/X_R \leq 1.10$ regulation (c1) $0.90 \leq X_G/X_R \leq 1.10$ in the regulations, $X_B$, $X_G$, and $X_R$ have the same meanings as $X_B$, $X_G$, and $X_R$ described above.

[3]

The head-up display system according to [1] or [2], in which the natural light reflectivities $R_B$, $R_G$, and $R_R$ of the selective reflection layer satisfy a relationship of $R_B > R_G \geq R_R$.

[4]

The head-up display system according to any one of [1] to [3], in which the natural light reflectivities $R_B$ and $R_G$ of the selective reflection layer satisfy a relationship of $R_B/R_G \geq 1.10$.

[5]

The head-up display system according to any one of [1] to [4], in which in the selective reflection layer, all of the selective reflection central wavelengths $\lambda_B$, $\lambda_G$, and $\lambda_R$ at the light incidence angle of 60° have a half-width of 100 nm or less, and all of the natural light reflectivities $R_B$, $R_G$, and $R_R$ are 25% or more.

[6]

The head-up display system according to any one of [1] to [5], in which the windshield glass includes at least one polarization conversion layer.

[7]

The head-up display system according to any one of [1] to [6], in which the selective reflection layer consists of a cholesteric liquid crystal.

[8]

The head-up display system according to any one of [1] to [5], in which the selective reflection layer is formed by laminating an optically anisotropic layer and an optically isotropic layer.

[9]

A transportation machine comprising the head-up display system according to any one of [1] to [8].

The head-up display system according to the embodiment of the present invention can project a screen image having a neutral image tint. Accordingly, in the transportation machine including the head-up display according to the embodiment of the present invention, the head-up display can project a screen image having a neutral image tint.

DESCRIPTION OF THE PREFERRED EMBODIMENTS

Figure 1:
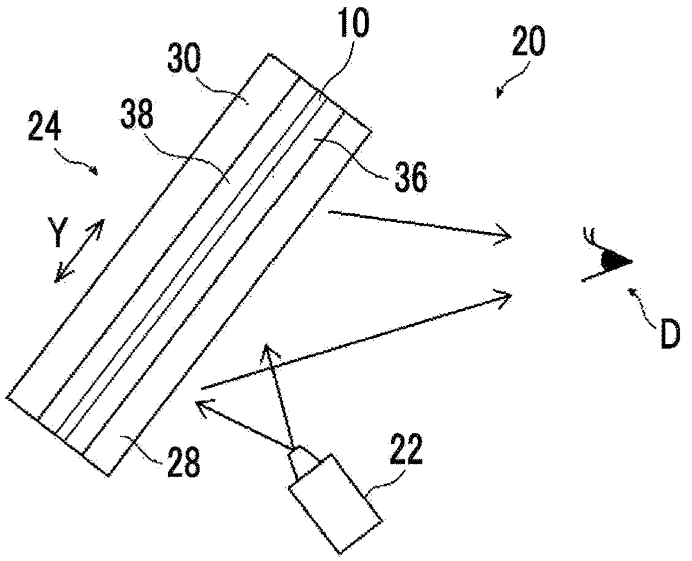
FIG. 1 is a schematic view schematically showing an example of a head-up display system according to the embodiment of the present invention.

In the present invention, the expression "to" is used to mean that numerical values described before and after "to" are included as a lower limit value and an upper limit value, respectively. For example, in a case where ε1 is a numerical value α1 to a numerical value β1, the range ε1 is a range including the numerical value α1 and the numerical value β1, which is expressed by a mathematical symbol $\alpha 1 \leq \varepsilon 1 \leq \beta 1$.

In the present invention, regarding "angle" represented by a specific numerical value such as 60°, the terms "parallel" and "perpendicular" include an error range generally accepted in the technical field of the present invention unless otherwise specified. For example, an angle is in a range of the exact angle less than ±10°, and the error from the exact angle is preferably 7° or less and more preferably 5° or less.

In the present invention, the term "sense" is used regarding circular polarized light means either dextrorotatory circularly polarized light or levorotatory circularly polarized light. The sense of circularly polarized light is defined such that, in a case where light is viewed as it proceeds toward a viewer, the sense is dextrorotatory circularly polarized light in a case where the distal end of the electric field vector rotates clockwise as time increases, and the sense is levorotatory circularly polarized light in a case where it rotates counterclockwise.

In the present invention, the term "sense" may be used for the twisted direction of the helix of the cholesteric liquid crystal. In a case where a twisted direction (sense) of a helix of a cholesteric liquid crystal is the right direction, the cholesteric liquid crystal reflects dextrorotatory circularly polarized light and transmits levorotatory circularly polarized light, and in a case where the sense is the left direction, the cholesteric liquid crystal reflects levorotatory circularly polarized light and transmits dextrorotatory circularly polarized light.

In the present invention, in a case where the term "light" is simply referred to, the term "light" means light of visible light and natural light (non-polarized light), unless otherwise noted. The visible light means light at a wavelength which is visible to the human eyes and is light in a wavelength range of 380 to 780 nm, among electromagnetic waves. Invisible light refers to light in a wavelength range of less than 380 nm or more than 780 nm.

Further, although not limited thereto, among visible light, light in a wavelength range of 420 to 490 nm is blue light (B light), light in a wavelength range of 495 to 570 nm is green light (G light), and light in a wavelength range of 620 to 750 nm is red light (R light). Furthermore, although not limited thereto, infrared light refers to invisible light in a wavelength range of more than 780 nm and 2,000 nm or less.

In the present invention, the term “visible light transmittance” is a visible light transmittance of an A light source defined in JIS (Japanese Industrial Standards) R 3212:2015 (Test methods of safety glazing materials for road vehicles). That is, the light transmittance is obtained by measuring a transmittance of each wavelength in a range of 380 to 780 nm with a spectrophotometer using the A light source, multiplying a wavelength distribution of International Commission on Illumination (CIE) photopic spectral luminous efficiency function and pre-calculated weighting functions obtained from an interval wavelength by the transmittance at each wavelength, and performing a weighted average. In addition, in a case of simply referring to “reflected light” or “transmitted light”, the “reflected light” and “transmitted light” include meanings of scattered light and diffracted light.

In the present invention, p-polarized light means polarized light that vibrates in a direction parallel to a light incident surface. The incident surface means a surface that is perpendicular to a reflecting surface (such as a surface of windshield glass) and that includes incident rays and reflected rays. A vibrating surface of an electric field vector of the p-polarized light is parallel to the incident surface.

In the present invention, a front phase difference is a value measured with AxoScan manufactured by Axometrics, Inc. Unless otherwise specified, a measurement wavelength is set to 550 nm. Light that has wavelengths in a visible light wavelength range is allowed to be incident into the normal direction of a film and measured to obtain a value by using KOBRA 21ADH or WR (manufactured by Oji Scientific Instruments), and the value can also be used as the front phase difference. In a case of selecting a measurement wavelength, a wavelength selective filter can be manually exchanged, or a measurement value can be converted using a program or the like to perform the measurement.

In the present invention, the birefringence ($\Delta n$) of the liquid crystal compound is a value measured according to the method described on p. 214 of “Liquid Crystal, Basic edition (edited by OKANO Koji and KOBAYASHI Shunsuke)”. Specifically, the liquid crystal compound is poured into a wedge-shaped cell and irradiated with light having a wavelength of 550 nm, and the refraction angle of the transmitted light is measured to obtain $\Delta n$ at 60° C.

In the present invention, the optical isotropy in the “optically isotropic layer” means that birefringence is not exhibited. On the other hand, the optical anisotropy in the “optically anisotropic layer” means birefringence is exhibited, and in the optically anisotropic layer, as described later, the refractive index $n_{e1}$ in the in-plane slow axis direction and the refractive index $n_{o2}$ in the direction (in-plane fast axis direction) orthogonal to the in-plane slow axis direction have a relationship of $n_{e1}>n_{o2}$.

In the present invention, the term “projection image” means an image based on projection of light from a projector to be used. In the head-up display system (HUD system) according to the embodiment of the present invention, the projection image is visually recognized by an observer as a virtual image that appears to float ahead of the flat part of the windshield glass as viewed from the observer.

In the present invention, the term “screen image” means an image displayed on a drawing device of the projector or an image drawn on an intermediate image screen or the like by the drawing device. Unlike a virtual image, the screen image is a real image.

Both the screen image and the projection image may be monochrome images, may be multicolor images with two or more colors, or may be full color images.

In addition, in the present invention, the term “liquid crystal compound” is used as including a state where liquid crystal properties is lost by curing or the like.

The HUD system according to the embodiment of the present invention is typically used by being mounted on a transportation machine of a vehicle such as an automobile and a train, an aircraft, and a ship.

Hereinafter, a head-up display system (hereinafter, referred to as HUD system) according to the embodiment of the present invention will be described in detail based on suitable Examples exemplified in the accompanying drawings. In the drawings, the dimensions and scale of each part may be different from actual dimensions and scale for convenience of description. In addition, the drawings may be schematically shown for easy understanding.

<<Head-Up Display System (HUD System)>>

An HUD system according to the embodiment of the present invention includes an HUD system having a windshield glass having a selective reflection layer and a projector including a laser light source for forming a projection image on the windshield glass.

As described later, the HUD system according to the embodiment of the present invention is a HUD system in which the selective reflection layer includes the following three wavelengths of $\lambda_B$, $\lambda_G$, and $\lambda_R$ as selective reflection central wavelengths at a light incidence angle of 60°, $$400\ \text{nm} \le \lambda_B < 500\ \text{nm}$$

$$500\ \text{nm} \le \lambda_G < 600\ \text{nm}$$

$$600\ \text{nm} \le \lambda_R < 700\ \text{nm}$$

the laser light source emits laser beam of three colors of blue light, green light, and red light, and all of the following regulations (a) to (c) are satisfied, Regulation (a) $0.80 \le X_B/X_G \le 1.20$ Regulation (b) $0.80 \le X_B/X_R \le 1.20$ Regulation (c) $0.80 \le X_G/X_R \le 1.20$ In the regulations, $X_B=R_B \times L_B$, $X_G=R_G \times L_G$, and $X_R=R_R \times L_R$.

$R_B$ indicates a natural light reflectivity of the selective reflection layer at $\lambda_B$, $R_G$ indicates a natural light reflectivity of the selective reflection layer at $\lambda_G$, and $R_R$ indicates a natural light reflectivity of the selective reflection layer at $\lambda_R$.

$L_B$ represents brightness of blue laser beam in light emitted from the projector, $L_G$ represents brightness of green laser beam in the light emitted from the projector, and $L_R$ represents brightness of red laser beam in the light emitted from the projector.

In the HUD system according to the embodiment of the present invention, the selective reflection layer has a selective reflection central wavelength in a specific wavelength range, and the product of the natural light reflectivity at the selective reflection central wavelength and the brightness of the laser beam in the light emitted from the projector is controlled to satisfy all of the regulations (a) to (c), whereby the balance of the light intensity in the visible light region of the light after being reflected from the windshield glass can be adjusted, and the image tint can be made neutral. That is, in a case where a white image is projected, a white image without a tint can be projected.

It is considered that while the laser beam emitted from the projector passes through a medium (usually air) before being incident on the selective reflection layer in the windshield glass, the brightness $L_B$, $L_G$, and $L_R$ of the laser beam of each color are hardly modulated because of the passage through the medium.

FIG. 1 shows an example of the HUD system according to the embodiment of the present invention.

The HUD system 20 according to the embodiment of the present invention shown in FIG. 1 is composed of a windshield glass 24 and a projector 22.

In the HUD system 20 exemplified in FIG. 1, the projector 22 emits p-polarized projection light, and the reflection film 10 in the windshield glass 24 reflects the p-polarized light to display a screen image.

Figure 2:
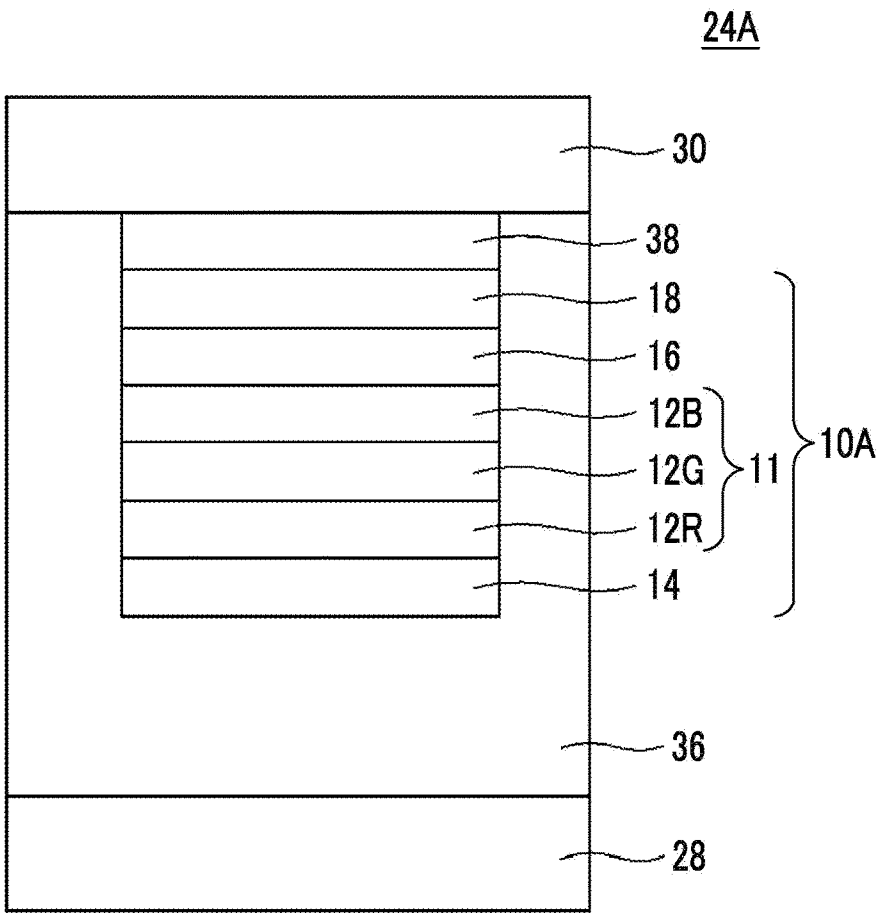
FIG. 2 is a schematic view showing one configuration example of a windshield glass having a linearly polarized light reflection film including a cholesteric liquid crystal layer, which is used in the head-up display system according to the embodiment of the present invention.

In a case where the windshield glass 24A including the linearly polarized light reflection film 10A shown in FIG. 2 is provided as the windshield glass 24, first, the polarization conversion layer 14 converts the p-polarized projection light incident from the second glass plate 28 side into circularly polarized light in the linearly polarized light reflection film 10A. Next, the selective reflection layer 11 (cholesteric liquid crystal layer 12) selectively reflects the circularly polarized light, and the reflected light is incident in the polarization conversion layer 14 again. Furthermore, the polarization conversion layer 14 converts the circularly polarized light into p-polarized light. Thereby, the linearly polarized light reflection film 10A reflects the incident p-polarized projection light as p-polarized light.

Therefore, the polarization conversion layer 14 is set to convert the incident p-polarized light into circularly polarized light in a turning direction, which is reflected by the selective reflection layer 11, according to the sense of the circularly polarized light that is selectively reflected by the selective reflection layer 11 (cholesteric liquid crystal layer 12). That is, in a case where the selective reflection layer 11 selectively reflects the dextrorotatory circularly polarized light, the polarization conversion layer 14 is set to make the incident p-polarized light dextrorotatory circularly polarized light. By contrast, in a case where the selective reflection layer 11 selectively reflects the levorotatory circularly polarized light, the polarization conversion layer 14 is set to make the incident p-polarized light the levorotatory circularly polarized light.

Figure 3:
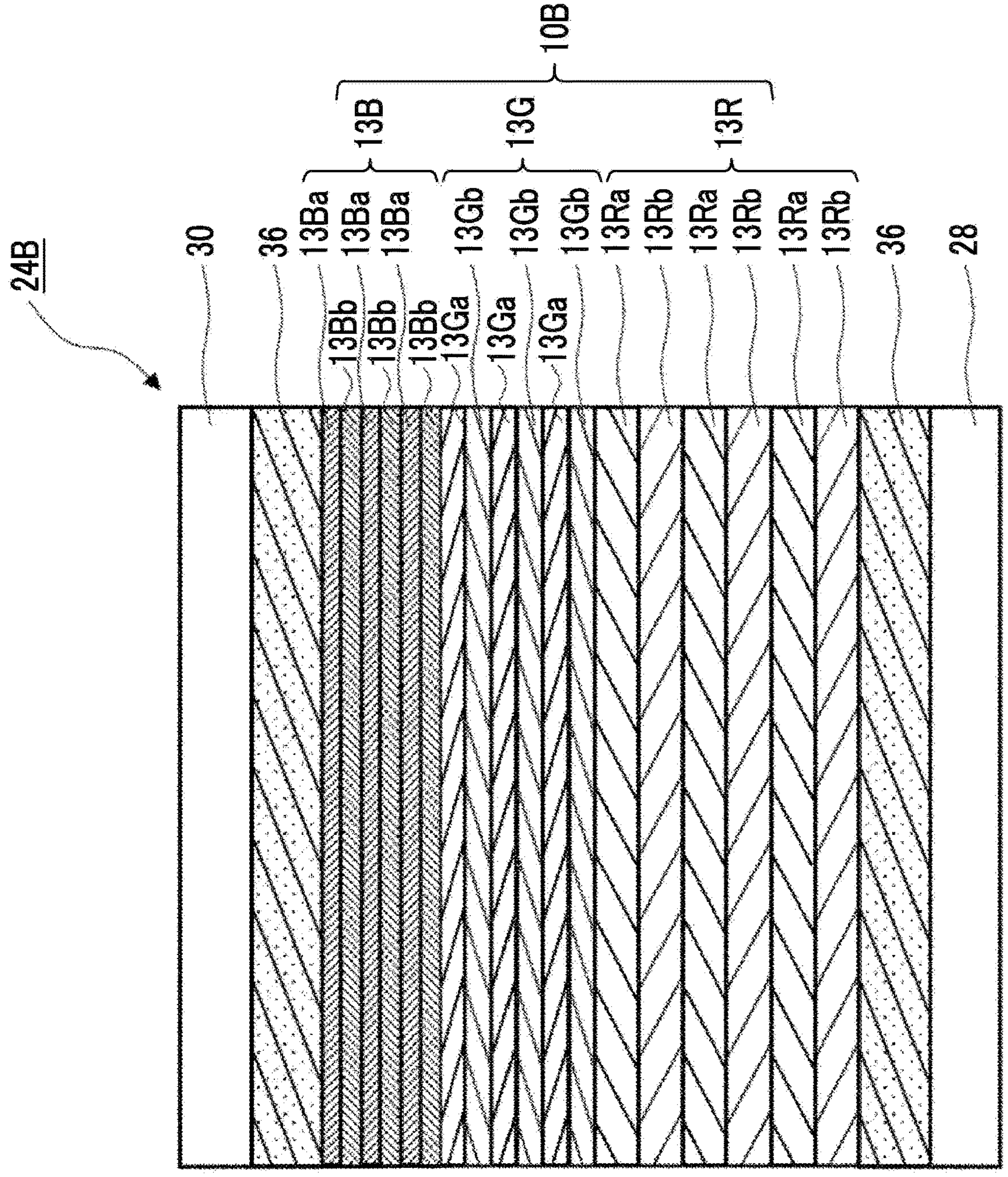
FIG. 3 is a schematic cross-sectional view showing one configuration example of a windshield glass having a linearly polarized light reflection film consisting of a dielectric multi-layer film, which is used in the head-up display system according to the embodiment of the present invention.

In a case where the windshield glass 24B including the linearly polarized light reflection film 10B shown in FIG. 3 is provided as the windshield glass 24, the p-polarized projection light incident from the second glass plate 28 side is reflected selectively as p-polarized light in the linearly polarized light reflection film 10B.

In the HUD system 20, the projector 22 preferably emits the p-polarized projection light to the second glass plate 28 in the windshield glass 24. The projection light is emitted to the windshield glass 24 by the projector 22 and converted into p-polarized light, thereby the reflection of the projection light by the first glass plate 30 and second glass plate 28 of the windshield glass 24 can be significantly reduced, and disadvantages that a double image is observed, and the like can be suppressed.

The projector 22 preferably emits the p-polarized projection light to the windshield glass 24 at the Brewster's angle. Therefore, the reflection of the projection light by the first glass plate 30 and the second glass plate 28 is eliminated, which allows display of a clearer screen image.

<Windshield Glass>

In FIG. 1, a windshield glass 24 is a windshield glass that includes a first glass plate 30, a reflection film 10 including a selective reflection layer, and a second glass plate 28 in this order.

The term "windshield glass" means common windows and windscreen glass for vehicles such as cars and trains, airplanes, ships, motorcycles, and vehicles such as playground equipment. The windshield glass is preferably used as a windshield, a windscreen glass, or the like in a forward vehicle in a traveling direction.

A windshield glass 24A shown in FIG. 2 includes a second glass plate 28, an interlayer film 36, the linearly polarized light reflection film 10A, a heat seal layer 38, and a first glass plate 30, in this order.

In FIG. 2, in the linearly polarized light reflection film 10A, the polarization conversion layer 14 is arranged on the second glass plate 28 side, and the retardation layer 16 (transparent substrate 18) is arranged on the first glass plate 30 side.

A windshield glass 24B shown in FIG. 3 includes a second glass plate 28, an interlayer film 36, the linearly polarized light reflection film 10B, an interlayer film 36, and a first glass plate 30, in this order.

In a case where the windshield glass is used in a vehicle, curved glass is often used as the second glass plate 28 and the first glass plate 30. In a case where the second glass plate 28 is positioned inside the vehicle and the first glass plate 30 is positioned outside the vehicle, a convex side of the second glass plate 28 is arranged to face the first glass plate 30, and a concave side of the first glass plate 30 is arranged to face the second glass plate 28.

In a case where each of the second glass plate 28 and the first glass plate 30 is curved glass, in the example shown in FIG. 2, the polarization conversion layer 14 and the selective reflection layer 11 are arranged in this order from the convex side of the second glass plate 28 toward the first glass plate 30 side. The retardation layer 16 is arranged between the selective reflection layer 11 and the first glass plate 30.

From the viewpoint of the legal regulation, a visible light transmittance of the windshield glass is preferably 70% or more, more preferably more than 70%, even more preferably 75% or more, and particularly preferably 80% or more.

The above described visible light transmittance is preferably satisfied at any position of the windshield glass, and particularly, the above described visible light transmittance is preferably satisfied at a position where the reflection film is present. As described later, the reflection film can have high visible light transmittance, and a configuration in which the above described visible light transmittance is satisfied can be achieved even in a case where any glass widely used for the windshield glass is used.

Figure 6:
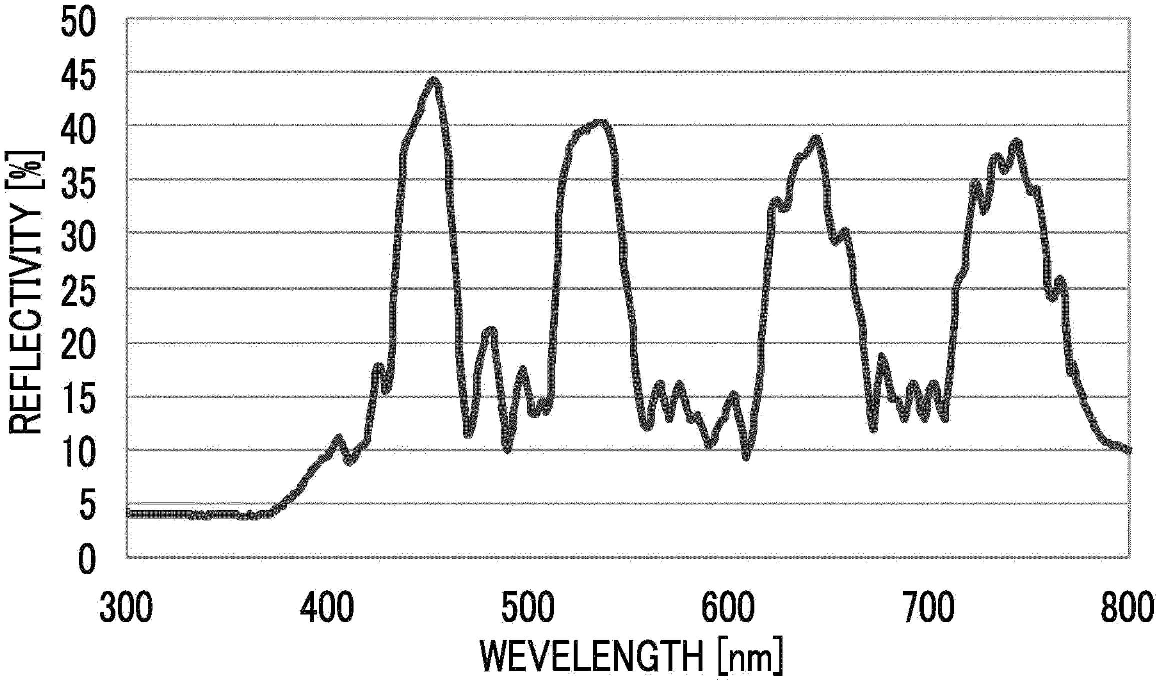
FIG. 6 is a natural light reflection spectrum of windshield glass No. 101 produced in Examples at a light incidence angle of 5°.
Figure 7:
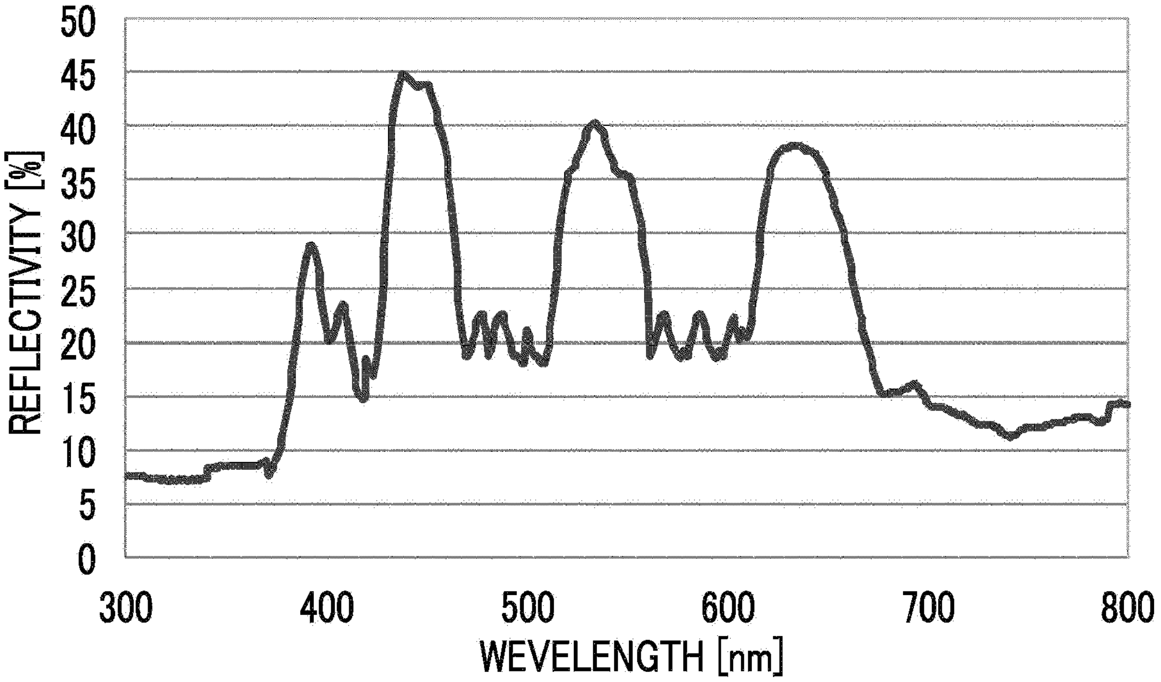
FIG. 7 is a natural light reflection spectrum of windshield glass No. 101 produced in Examples at a light incidence angle of 60°.

FIGS. 6 and 7 show an example of a natural light reflection spectrum of the windshield glass. In this example, the light incidence angle is set to 5° or 60° in the windshield glass No. 101 in Examples.

As shown in FIGS. 6 and 7, it is found that the reflection film including the selective reflection layer used in the present invention has a reflection peak derived from the selective reflection layer even in a case where the reflection film is sandwiched between thick glasses.

The shape of the windshield glass is not limited, and is appropriately determined according to a target on which the windshield glass is arranged. The windshield glass may be, for example, a flat surface or a three-dimensional shape having a curved surface such as a concave or a convex. In the windshield glass molded for an applicable vehicle, the upward direction during normal use, and surfaces becoming the observer side, the driver side, and the visible side such as the inside of the vehicle can be specified.

In the windshield glass, the reflection film may be provided at a projection image display portion (projection image reflection portion) of the windshield glass.

Furthermore, in the windshield glass, the reflection film may be provided between glasses of the windshield glass having a structure of laminated glass, or may be provided on an outer surface of a glass plate of the windshield glass.

In a case where the reflection film including the selective reflection layer used in the present invention is provided on the outer surface of the glass plate of the windshield glass, the reflection film may be provided on the inside (a side into which the projection image is incident) of a vehicle or the like or may be provided on the outside, but is preferably provided on the inside.

The reflection film including the selective reflection layer used in the present invention has lower scratch resistance than the glass plate. Therefore, in a case where the windshield glass has a laminated glass structure, the reflection film is more preferably provided, for the purpose of protection, between two sheets of glass constituting the laminated glass.

As described above, the reflection film is a member for displaying a projection image by reflecting the projection image. Therefore, the reflection film may be provided at a position where the projection image projected from the projector or the like can be visually displayed.

That is, the reflection film including the selective reflection layer used in the present invention functions as a combiner of the HUD system. In the HUD system, the combiner means an optical member that can display a screen image projected from a projector in a visible manner, and in a case where the combiner is observed from a surface side into which the projection image is incident, information on a surface side opposite to the surface side into which the projection light is incident can be observed at the same time. That is, the combiner functions as an optical path combiner for superimposing and displaying external light and light of a projection image.

The reflection film may be provided on the entire surface of the windshield glass, or may be provided on a part of the windshield glass in a plane direction, but is preferably provided on a part of the windshield glass.

In a case where the reflection film is provided on a part of the windshield glass, the reflection film may be provided at any position on the windshield glass, but the reflection film is preferably provided so that a virtual image is displayed at a position where the image can be easily visible from an observer such as a driver during the use of the HUD system. For example, a position where the reflection film is provided on the windshield glass may be determined based on the relationship between a position of the driver's seat in the vehicle in which the HUD system is mounted and a position where the projector is installed.

The reflection film may have a flat surface shape having no curved surface, and may have a curved surface. In addition, the reflection film may have a concave or convex shape as an entirety, and the projection image may be displayed to be enlarged or reduced.

[1] Reflection Film

The reflection film 10 is not particularly limited as long as the reflection film includes a selective reflection layer in which three wavelengths of $\lambda_B$, $\lambda_G$, and $\lambda_R$ described later as selective reflection central wavelengths at a light incidence angle of 60° are included, and all of the regulations (a) to (c) described later between respective color laser beams in the laser light source can be satisfied.

[Selective Reflection Layer]

The windshield glass used in the HUD system according to the embodiment of the present invention includes the following selective reflection layer.

That is, the selective reflection layer includes three wavelengths of $\lambda_B$, $X_G$, and $\lambda_R$ as selective reflection central wavelengths at a light incidence angle of 60°, $$400\text{ nm} \le \lambda_B < 500\text{ nm}$$

$$500\text{ nm} \le \lambda_G < 600\text{ nm}$$

$$600\text{ nm} \le \lambda_R < 700\text{ nm}$$

all of the following regulations (a) to (c) are satisfied between laser beams of three colors of blue light, green light, and red light emitted from the projector used in the HUD system according to the embodiment of the present invention.

Regulation (a) $0.80 \le X_B/X_G \le 1.20$

Regulation (b) $0.80 \le X_B/X_R \le 1.20$

Regulation (c) $0.80 \le X_G/X_R \le 1.20$

In the regulations, $X_B=R_B \times L_B$, $X_G=R_G \times L_G$, and $X_R=R_R \times L_R$.

$R_B$ indicates a natural light reflectivity of the selective reflection layer at $\lambda_B$, $R_G$ indicates a natural light reflectivity of the selective reflection layer at $X_G$, and $R_R$ indicates a natural light reflectivity of the selective reflection layer at $\lambda_R$.

$L_B$ represents brightness of blue laser beam in light emitted from the projector, $L_G$ represents brightness of green laser beam in the light emitted from the projector, and $L_R$ represents brightness of red laser beam in the light emitted from the projector.

The unit of the natural light reflectivity $R_B$, $R_G$, and $R_R$ and the unit of the brightness $L_B$, $L_G$, and $L_R$ of each color laser beam in the light emitted from the projector may be standardized such that the ratio of two of $X_B$, $X_G$, and $X_R$ described in regulations (a) to (c) can be correctly taken. Hereinafter, the unit of the natural light reflectivity $R_B$, $R_G$, and $R_R$ is in terms of %, and the unit of the brightness $L_B$, $L_G$, and $L_R$ of each color laser beam in the light emitted from the projector is in terms of cd/m$^2$.

In the present invention, the selective reflection central wavelength of the selective reflection layer and the half-width of the reflection peak having the selective reflection central wavelength are obtained as follows.

As will be described in detail in Examples below, in a case where a reflection spectrum at a desired light incidence angle (for example, 60°) with respect to the normal direction of the selective reflection layer is measured using a spectrophotometer (manufactured by JASCO Corporation, V-670), a maximal peak of reflectivity is observed in a selective reflection band. Among the two wavelengths that are intermediate (average) reflectivity between a maximal reflectivity of the peak and a minimal reflectivity at the bottom of the maximal peak, in a case where a wavelength value of a shorter wavelength side is set $\lambda_l$(nm) and a wavelength value of a longer wavelength side is set $\lambda_h$ (nm), the selective reflection central wavelength $\lambda$ and the half-width $\lambda 2$ thereof can be expressed by the following expression.

$$\lambda = (\lambda_1 + \lambda_h)/2$$

$$\Delta\lambda = (\lambda_h - \lambda_1)$$

In a case where the selective reflection layer consists of a cholesteric liquid crystal, the selective reflection central wavelength which is obtained as described above substantially coincides with a wavelength at the center of gravity of reflection peak of circular polarization reflection spectrum measured at a desired light incidence angle with respect to the normal direction of the selective reflection layer.

In addition, in the present invention, the natural light reflectivity at the selective reflection central wavelength of the selective reflection layer is also determined by the method described in Examples below.

The reflection spectrum of the selective reflection layer is measured in a state of the windshield glass including the selective reflection layer, as described in Examples below.

In the present invention, the brightness $L_B$ of the blue laser beam in the light emitted from the projector, the brightness $L_G$ of the green laser beam in the light emitted from the projector, and the brightness $L_R$ of the red laser beam in the light emitted from the projector respectively mean the brightness of the blue laser beam, the brightness of the green laser beam, and the brightness of the red laser beam in the light emitted from the projector.

For example, in a case where the drawing device of the projector does not include the laser brightness modulation unit, the brightness of the laser beam of each color in the laser light source is the brightness $L_B$, $L_G$, and $L_R$ of the laser beam in the light emitted from the projector. On the other hand, in a case where the drawing device of the projector includes the laser brightness modulation unit such as external modulator, the brightness of the laser beam of each color after the brightness of the laser beam in the laser light sources is modulated by the laser brightness modulation unit is the brightness $L_B$, $L_G$, and $L_R$ of the laser beam in the light emitted from the projector. Hereinafter, the brightness $L_B$, $L_G$, and $L_R$ of laser beam are also simply referred to as $L_B$, $L_G$, and $L_R$.

The brightnesses $L_B$, $L_G$, and $L_R$ of the laser beam of blue light, green light, and red light are appropriately adjusted to satisfy all of the above regulations (a) to (c) between with the natural light reflectivity $R_B$, $R_G$, and $R_R$ of the selective reflection layer.

The brightness $L_B$, $L_G$, and $L_R$ of the laser beam may be appropriately set according to the environment, such as high brightness (for example, about 10,000 cd/$m^2$) in a bright environment such as daytime and low brightness (for example, about 3 cd/$m^2$) in a dark environment such as nighttime, and specific examples thereof is preferably 1 to 30,000 cd/$m^2$ and more preferably 2 to 20,000 cd/$m^2$.

In the present invention, the brightness $L_B$, $L_G$, and $L_R$ of the laser beam are values obtained by measuring the output light of each laser emitted from the projector using a brightness meter (for example, a brightness meter BM-5A (trade name) manufactured by TOPCON CORPORATION).

The selective reflection central wavelengths $\lambda_B$, $\lambda_G$, and $\lambda_R$ at a light incidence angle of 60° are appropriately adjusted to satisfy all of the regulations (a) to (c) between with the wavelength of the laser light source to be used.

From the relationship with generally used blue, green, and red laser beams, $\lambda_B$ is preferably in a wavelength range of 430 to 470 nm and more preferably in a wavelength range of 440 to 460 nm, $\lambda_G$ is preferably in a wavelength range of 500 to 550 nm and more preferably in a wavelength range of 510 to 540 nm, and $\lambda_R$ is preferably in a wavelength range of 600 to 650 nm and more preferably in a wavelength range of 610 to 640 nm.

From the viewpoint of making the image tint close to neutral and improving the image tint, the regulations (a) to (c) are preferably the following regulations (a1) to (c1), respectively.

Regulation (a1) $0.90 \le X_B/X_G \le 1.10$

Regulation (b1) $0.90 \le X_B/X_R \le 1.10$

Regulation (c1) $0.90 \le X_G/X_R \le 1.10$

In the regulations, $X_B$, $X_G$, and $X_R$ have the same meanings as $X_B$, $X_G$, and $X_R$ described above.

The upper limit value of $X_B/X_G$, $X_B/X_R$, and $X_G/X_R$ in the above regulations (a1) to (c1) is preferably 1.05 or less, more preferably 1.03 or less, and still more preferably 1.00 or less.

The natural light reflectivity $R_B$, $R_G$, and $R_R$ of the selective reflection layer preferably satisfy a relationship of $R_B > R_G \ge R_R$ from the viewpoint of making the reflection tint at an incidence angle of 60° closer to white and further improving transparency.

In addition, the natural light reflectivity $R_B$ and $R_G$ of the selective reflection layer preferably satisfy a relationship of $R_B/R_G \ge 1.10$ from the viewpoint of making the reflection tint at an incidence angle of 5° closer to white and further improving transparency.

The upper limit value of $R_B/R_G$ is not particularly limited, but practically 1.30 or less. In addition, the $R_G/R_R$ is not particularly limited, but practically 0.90 to 1.10, and preferably 1.00 to 1.10.

As described above, an in-vehicle head-up display system is required to have a transmittance of more than the transmittance set forth in legal regulations in Japan and the transparent appearance tint even viewed from various angles from the viewpoint of designability. It has been conventionally considered to reduce the reflectivity to maintain a transmittance of 70% or more complying with the regulations and bring the appearance tint to be almost transparent (white). However, in a case where the reflectivity is lowered too much, the brightness of a display image (projection image) is lowered, and the visibility is deteriorated.

In the present invention, since a laser light source having a narrow band of luminescence wavelengths is used, it is preferable that all half-widths of selective reflection central wavelengths $\lambda_B$, $\lambda_G$, and $\lambda_R$ at a light incidence angle of 60° included in the selective reflection layer are 100 nm or less, and all of the natural light reflectivity $R_B$, $R_G$, and $R_R$ are 25% or more, from the viewpoint that the imager light can be efficiently reflected and the brightness of a screen image (clearness of a display image) can be increased while maintaining a high transmittance.

In a windshield glass in which a reflection film having a selective reflection layer with a half-width of selective reflection central wavelengths of 100 nm or less and with a natural light reflectivity of 25% or more is sandwiched between green glasses, a natural light transmittance can be 70% or more (80% or more in a case of being sandwiched between clear glasses).

From the viewpoint that the transmittance can be increased while improving the reflection tint, all of the natural light reflectivity $R_B$ in $\lambda_B$, the natural light reflectivity $R_G$ in $\lambda_G$, and the natural light reflectivity $R_R$ in $\lambda_R$ of the selective reflection layer are preferably 25% to 60% and more preferably 30% to 50%.

As shown in an example in FIG. 6, all of the natural light reflectivities of the selective reflection layer used in the present invention at a light incidence angle of 5° can be suppressed to less than 50%.

From the viewpoint that the transmittance can be increased while improving the reflection tint, the half-width of the selective reflection central wavelength $\lambda_B$ at a light incidence angle of 60° is preferably 10 to 100 nm and more preferably 15 to 40 nm.

Similarly, from the viewpoint that the transmittance can be increased while improving the reflection tint, the half-width of the selective reflection central wavelength $\lambda_G$ at a light incidence angle of 60° is preferably 10 to 100 nm and more preferably 15 to 55 nm.

Similarly, from the viewpoint that the transmittance can be increased while improving the reflection tint, the half-width of the selective reflection central wavelength $\lambda_R$ at a light incidence angle of 60° is preferably 10 to 100 nm and more preferably 15 to 55 nm.

In a case where the selective reflection layer includes a layer (for example, a cholesteric liquid crystal layer UV described later) having a selective reflection central wavelength of 300 nm or more and less than 400 nm at a light incidence angle of 60° described above, the selective reflection central wavelength $\lambda_{UV}$ of the layer at a light incidence angle of 60° is preferably 330 to 395 nm and more preferably 350 to 390 nm.

In addition, the natural light reflectivity $R_{UV}$ of the selective reflection layer at $\lambda_{UV}$ is preferably 25% to 60% and more preferably 25% to 50%. The half-width of selective reflection central wavelength $\lambda_{UV}$ at a light incidence angle of 60° is preferably 10 to 100 nm and more preferably 15 to 40 nm.

Preferred examples of the reflection film including the above-mentioned selective reflection layer include a linearly polarized light reflection film including a cholesteric liquid crystal layer having a function of reflecting circularly polarized light, and a linearly polarized light reflection film including a selective reflection layer (hereinafter, also referred to as a "dielectric multi-layer film") having a function of reflecting linearly polarized light, which is formed by laminating an optically anisotropic layer and an optically isotropic layer.

Hereinafter, the linearly polarized light reflection film will be sequentially described based on the linearly polarized light reflection film 10A in the windshield glass 24A shown in FIG. 2 and the linearly polarized light reflection film 10B in the windshield glass 24B shown in FIG. 3. In addition, the cholesteric liquid crystal layer and the dielectric multi-layer film will be respectively described in the description of each linearly polarized light reflection film.

[1-1] Linearly Polarized Light Reflection Film Including a Cholesteric Liquid Crystal Layer FIG. 2 is a diagram schematically showing an example of a windshield glass 24 used in the present invention, and a linearly polarized light reflection film 10A included in the windshield glass 24 includes a polarization conversion layer 14, a selective reflection layer 11, a retardation layer 16, and a transparent substrate 18 in this order.

The selective reflection layer 11 includes three cholesteric liquid crystal layers (12R, 12G, 12B). Three cholesteric liquid crystal layers have different selective reflection central wavelengths at a light incidence angle of 60°, and respectively correspond to a cholesteric liquid crystal layer 12B having a selective reflection central wavelength $\lambda_B$ at a light incidence angle of 60° which will be described later, a cholesteric liquid crystal layer 12G having a selective reflection central wavelength $\lambda_G$ at a light incidence angle of 60° which will be described later, and a cholesteric liquid crystal layer 12R having a selective reflection central wavelength $\lambda_R$ at a light incidence angle of 60° which will be described later. In the example shown in the drawing, the cholesteric liquid crystal layer 12R, the cholesteric liquid crystal layer 12G, and the cholesteric liquid crystal layer 12B are included in this order. In addition, in the example shown in the drawing, each of cholesteric liquid crystal layers is in direct contact with any other cholesteric liquid crystal layers.

Although not shown in FIG. 2, in addition to the three cholesteric liquid crystal layers (12R, 12G, and 12B), a cholesteric liquid crystal layer (hereinafter, referred to as cholesteric liquid crystal layer UV) having a selective reflection central wavelength of 300 nm or more and less than 400 nm at a light incidence angle of 60° is preferably included from the viewpoint of suppressing the reflection tint.

By providing the cholesteric liquid crystal layer UV, in the case of a configuration of a windshield glass including a cholesteric liquid crystal layer and a retardation layer which will be described later, it is possible to suppress a tint (particularly, a yellow tint) which is confirmed in a case where the windshield glass is observed under external light.

As is well known, a cholesteric liquid crystal layer is a layer composed of a liquid crystal compound in an alignment state of a helical structure in which a cholesteric liquid crystalline phase is immobilized, reflects light having a selective reflection central wavelength corresponding to a pitch of the helical structure, and transmits light in another wavelength range. In addition, the cholesteric liquid crystal layer exhibits selectively reflecting properties in response to either levorotatory circularly polarized light or dextrorotatory circularly polarized light at a specific wavelength.

In the selective reflection layer including the cholesteric liquid crystal layer, the reflected wavelength and reflectivity can be adjusted according to a selective reflection central wavelength and a thickness (the number of helical pitches) of the cholesteric liquid crystal layer, and the like.

Here, as shown in FIG. 2, individual cholesteric liquid crystal layers are preferably in direct contact with any other cholesteric liquid crystal layers. For example, in an example shown in FIG. 2, the cholesteric liquid crystal layer 12R having a selective reflection central wavelength $\lambda_R$ at a light incidence angle of 60° and the cholesteric liquid crystal layer 12G having a selective reflection central wavelength $\lambda_G$ at a light incidence angle of 60° are mutually contacted, and the cholesteric liquid crystal layer 12G having a selective reflection central wavelength $\lambda_G$ at a light incidence angle of 60° and the cholesteric liquid crystal layer 12B having a selective reflection central wavelength $\lambda_B$ at a light incidence angle of 60° are mutually contacted.

In a case where the cholesteric liquid crystal layers are spaced from each other, a film thickness between the layers is thick, and it is difficult to obtain the effect of interference of light reflected by each of the cholesteric liquid crystal layers. On the other hand, by adopting a configuration in which the cholesteric liquid crystal layers are in contact with each other, the wavelength bandwidth can be narrowed because of the effect of interference of light reflected by each of the cholesteric liquid crystal layers. In particular, in a case where a film thickness of each of the cholesteric liquid crystal layers is thinner than a wavelength of light (visible light of 380 nm to 780 nm), the effect of interference is more remarkable.

In the present invention, the cholesteric liquid crystal layers are not limited to a configuration in which the individual cholesteric liquid crystal layers are in direct contact with each other, and the cholesteric liquid crystal layers may be configured to be laminated via an adhesive layer or the like.

Here, each of the cholesteric liquid crystal layers may have at least one selective reflection central wavelength of the above-described three wavelengths $\lambda_B$, $\lambda_G$,and $\lambda_R$ as selective reflection central wavelengths at a light incidence angle of 60°, but at least one cholesteric liquid crystal layer may have two or more selective reflection central wavelengths. A cholesteric liquid crystal layer having two or more selective reflection central wavelengths is achieved by adopting a helical structure in which a helical pitch changes in a thickness direction.

In the example shown in the drawing, the selective reflection layer 11 has a configuration in which three cholesteric liquid crystal layers having different selective reflection central wavelengths are provided. However, the present invention is not limited thereto, and the selective reflection layer 11 may be a cholesteric liquid crystal layer having a single layer, and may be a cholesteric liquid crystal layer having two or four or more cholesteric liquid crystal layers.

From the viewpoint of exhibiting high transmittance while exhibiting sufficient natural light reflectivity by the selective reflection layer 11, the total thickness of the selective reflection layer 11 is preferably 0.5 to 30 μm and more preferably 1 to 15 μm.

Here, the reflection film described above preferably reflects linearly polarized light. In a case where the reflection film is incorporated in the windshield glass and used as a combiner for a head-up display, the projected image light is preferably p-polarized light, that is, linearly polarized light in order to prevent reflection on the surface of the windshield glass.

In the linearly polarized light reflection film as shown in FIG. 2, the selective reflection layer consisting of a cholesteric liquid crystal layer reflects circularly polarized light. Therefore, the linearly polarized light reflection film preferably has a layer that converts linearly polarized light incident on the reflection film into circularly polarized light.

Examples of the layer that converts a polarization state of light include a polarization conversion layer and a retardation layer.

The polarization conversion layer exhibits optical rotation properties and birefringence with respect to visible light, and converts a polarization state of incident light. In the present invention, the polarization conversion layer formed of a layer in which a material having birefringence, such as a liquid crystal compound, is aligned with the amount of twist at 360° or less.

In the retardation layer, a phase difference (optical path difference) is added to two orthogonal polarized light components to change the state of the incident polarized light. In the present invention, the retardation layer is a layer formed by a material having birefringence, such as a liquid crystal compound, which is aligned in the same direction, and does not have optical rotation properties.

By adopting a configuration in which the reflection film has a polarization conversion layer or a retardation layer on the selective reflection layer side onto which light is incident, linearly polarized light incident on the reflection film is converted into circularly polarized light, the selective reflection layer reflects circularly polarized light, and the reflected circularly polarized light is converted into linearly polarized light by the polarization conversion layer or the retardation layer and emitted.

Here, in the example of the windshield glass shown in FIG. 2, the reflection film 10 has the polarization conversion layer 14 on one surface side of the selective reflection layer 11, has the retardation layer 16 on the other surface side thereof, and is disposed such that the polarization conversion layer 14 is on the second glass plate 28 side which is the inside of the vehicle and the retardation layer 16 is on the first glass plate 30 side which is the outside of the vehicle.

In this case, the polarization conversion layer 14 has a function of converting the projected p-polarized light (linearly polarized light) into circularly polarized light reflected by the cholesteric liquid crystal layer of the selective reflection layer 11.

On the other hand, the retardation layer 16 has a function of optically compensating for light incident from the outside of the windshield glass. For example, in a case of s-polarized light incident from the outside of the windshield glass, a polarization state changes when the s-polarized light passes through the polarization conversion layer 14, and a component of p-polarized light is mixed. Since a polarized sunglass cuts off the s-polarized light, this component of the p-polarized light transmits the polarized sunglass. Therefore, there is a problem that the function of the polarized sunglass to cut off the glare of the reflected light that is mainly composed of s-polarized light is impaired, which hinders driving. By contrast, a configuration in which the retardation layer 16 is provided, and the retardation layer 16 is used for optical compensation enables an improvement of the suitability for polarized sunglass.

In the example illustrated in FIG. 2, the reflection film 10 has a configuration in which the polarization conversion layer 14 is arranged on the second glass plate 28 side, which is the inside of the vehicle, and the retardation layer 16 is arranged on the first glass plate 30 side, which is on the outside of the vehicle, but the present invention is not limited thereto. The reflection film 10 may have a configuration in which the polarization conversion layer 14 is arranged on the first glass plate 30 side, which is the outside of the vehicle, and the retardation layer 16 is arranged on the second glass plate 28 side, which is the inside of the vehicle.

In this case, the retardation layer 16 has a function of converting the projected p-polarized light (linearly polarized light) into circularly polarized light reflected by the cholesteric liquid crystal layer of the selective reflection layer 11.

On the other hand, the polarization conversion layer 14 has a function of optically compensating for light incident from the outside of the windshield glass, and optical compensation by the polarization conversion layer 14 enables an improvement of the suitability for the polarized sunglass.

In addition, the reflection film may have a configuration in which polarization conversion layers are provided on both sides of the selective reflection layer 11 or a configuration in which retardation layers are provided on both sides.

In this case, a polarization conversion layer or a retardation layer arranged inside the vehicle may be configured to have a function of converting the projected p-polarized light (linearly polarized light) into circularly polarized light reflected by the cholesteric liquid crystal layer of the selective reflection layer 11.

By contrast, a polarization conversion layer or a retardation layer arranged on the outside of the vehicle may be configured to have a function of optically compensating for light incident from the outside of the windshield glass.

The polarization conversion layer and the retardation layer will be described in detail later.

Hereinafter, the cholesteric liquid crystal layer, the polarization conversion layer, the retardation layer, and the transparent substrate, which are constituent elements of the linearly polarized light reflection film including the cholesteric liquid crystal layer, will be described in detail.

[Cholesteric Liquid Crystal Layer]

The cholesteric liquid crystal layer is not particularly limited as long as the cholesteric liquid crystal layer includes three wavelengths of $\lambda_B$, $\lambda_G$, and $\lambda_R$ described above as selective reflection central wavelengths at a light incidence angle of 60°, and satisfies all of the regulations (a) to (c) described above between respective color laser beams in the laser light source.

In the present invention, a cholesteric liquid crystal layer means a layer formed with a cholesteric liquid crystalline phase being immobilized.

The cholesteric liquid crystal layer may be any layer as long as the alignment of a liquid crystal compound serving as the cholesteric liquid crystalline phase is maintained. The cholesteric liquid crystal layer may be typically a layer in which the polymerizable liquid crystal compound may be brought into the alignment state of a cholesteric liquid crystalline phase and polymerized and cured by ultraviolet light irradiation, heating, and the like to form a layer that has no fluidity and also whose alignment is not changed by an external field or an external force. In the cholesteric liquid crystal layer, it is sufficient that optical properties of the cholesteric liquid crystalline phase are maintained in the layer, and the liquid crystal compound in the layer may not exhibit liquid crystal properties anymore. For example, the polymerizable liquid crystal compound may have high molecular weight due to a curing reaction and may already lose liquid crystal properties.

It is known that the cholesteric liquid crystalline phase exhibits properties of selectively reflecting circularly polarized light, that is, the cholesteric liquid crystalline phase selectively reflects circularly polarized light with any one sense of levorotatory circularly polarized light or dextrorotatory circularly polarized light, and transmits circularly polarized light with the other sense.

A large number of films formed of a composition including a polymerizable liquid crystal compound have been known in the related art, as a film including a layer with a cholesteric liquid crystalline phase, which exhibits properties of selectively reflecting circularly polarized light phase and is immobilized. Thus, regarding the cholesteric liquid crystal layer, the technologies of the related art can be referred to.

A central wavelength λ of selective reflection (selective reflection central wavelength) of the cholesteric liquid crystal layer at a light incidence angle of 5° depends on a pitch P (=a period of a helix) of a helical structure (helical alignment structure) in the cholesteric liquid crystalline phase, and is based on a relationship between an average refractive index n of the cholesteric liquid crystal layer and $\lambda = n \times P$.

As is clear from the above Expression, the selective reflection central wavelength can be controlled by adjusting the n value and/or the P value. In other words, the pitch P (one pitch of a helix) of the helical structure is the length in the helical axial direction for one turn of a helix, that is the length in the helical axial direction in which a director (the long axis direction in a rod-shaped liquid crystal) of the liquid crystal compound for forming the cholesteric liquid crystalline phase is rotated by 360°. The helical axial direction of the normal cholesteric liquid crystal layer coincides with a thickness direction of the cholesteric liquid crystal layer.

In the head-up display system described above, the reflectivity at the surface of a glass plate on the projection light incidence side can be decreased by using the head-up display system so that light is obliquely incident on the windshield glass.

At this time, light is also obliquely incident on the cholesteric liquid crystal layer constituting the selective reflection layer 11 of the reflection film 10. For example, light that is incident at an angle of 45° to 70° relative to the normal line of the reflection film 10 in the air having a refractive index of 1 is transmitted through a cholesteric liquid crystal layer having a refractive index of about 1.61 at an angle of about 26° to 36°. In this case, the reflection wavelength shifts to the shorter wavelength side.

In a case where the selective reflection central wavelength at a light incidence angle of 5° is a wavelength λd when a ray passes through a cholesteric liquid crystal layer having the selective reflection central wavelength as a wavelength λ at an angle θ2 with respect to the normal direction of the cholesteric liquid crystal layer (helical axial direction of cholesteric liquid crystal layer), the wavelength λd is represented by the following Expression.

$$\lambda d = \lambda \times \cos\theta 2$$

Therefore, for example, the cholesteric liquid crystal layer having a selective reflection central wavelength λ in a range of 650 to 780 nm can reflect projection light in a range of 520 to 695 nm at an angle θ2 of 26° to 36°.

Such a wavelength range is a wavelength range with high luminosity factor and thus highly contributes to the brightness of the projection image, and as a result, a projection image with high brightness can be realized.

The helical pitch of the cholesteric liquid crystalline phase depends on the type of chiral agents used together with the polymerizable liquid crystal compound and the addition concentration thereof. Thus, a desired pitch can be obtained by adjusting the type and the addition concentration. As a method of measuring helical sense and pitch, the methods described in "Introduction to Experimental Liquid Crystal Chemistry", edited by The Japanese Liquid Crystal Society, published in 2007 by Sigma Publishing Co., Ltd., p. 46, and "Liquid Crystal Handbook", the Editing Committee of Liquid Crystal Handbook, Maruzen Publishing Co., Ltd., p. 196 can be used.

As each cholesteric liquid crystal layer, a cholesteric liquid crystal layer in which the helical sense is right or left is used. The sense of circular polarized light reflected by the cholesteric liquid crystal layer (turning direction of circular polarized light) coincides with a helical sense.

In a case where the plurality of cholesteric liquid crystal layers having selective reflection central wavelengths different from each other are provided, a helical sense of each cholesteric liquid crystal layer may be the same as each other or different from each other.

However, it is preferable that all of helical senses of the plurality of cholesteric liquid crystal layers are the same as each other.

In a case where the reflection film 10 includes a plurality of the cholesteric liquid crystal layers as the selective reflection layer 11, the reflection film 10 preferably does not include cholesteric liquid crystal layers having different helical senses as cholesteric liquid crystal layers that exhibit selective reflection in the same or overlapping wavelength range. The reason for this is to avoid a decrease in the transmittance to, for example, less than 50% in a specific wavelength range.

A half-width Δλ (nm) of a selective reflection band exhibiting selective reflection depends on the birefringence Δn of the liquid crystal compound and the pitch P and satisfies a relationship of $\Delta\lambda=\Delta n\times P$. Accordingly, a width of the selective reflection band can be controlled by adjustment of the $\Delta n$. The value of $\Delta n$ can be adjusted by adjusting the type of the polymerizable liquid crystal compound or a mixing ratio thereof or controlling a temperature at the time of immobilizing the alignment.

In order to form one type of cholesteric liquid crystal layer having the same selective reflection central wavelength, a plurality of cholesteric liquid crystal layers having the same pitch P and the same helical sense may be laminated. By lamination of the cholesteric liquid crystal layers having the same pitch P and the same helical sense, the circular polarization selectivity at a specific wavelength can be increased.

In the selective reflection layer 11, in a case where the plurality of cholesteric liquid crystal layers are laminated, a separately produced cholesteric liquid crystal layer may be laminated using an adhesive or the like, or a step of directly applying a liquid crystal composition containing a polymerizable liquid crystal compound and the like to the surface of the cholesteric liquid crystal layer formed by a method which will be described later, and carrying out alignment and immobilization may be repeatedly performed, and the latter is preferable.

This is because, by directly forming a subsequent cholesteric liquid crystal layer to the surface of a cholesteric liquid crystal layer formed in advance, an alignment direction of liquid crystal molecules on an air interface side of the cholesteric liquid crystal layer formed in advance and an alignment direction of liquid crystal molecules on a lower side of the cholesteric liquid crystal layer formed thereon coincide with each other, and excellent polarization properties of the laminate of the cholesteric liquid crystal layers are obtained. In addition, this is because, interference unevenness which may occur due to uneven thickness of the adhesive layer is not observed.

The thickness of the cholesteric liquid crystal layer is preferably 0.2 to 10 μm, more preferably 0.3 to 8 μm, and even more preferably 0.4 to 5 μm.

(Method for Producing Cholesteric Liquid Crystal Layer)

Hereinafter, materials and a method for producing the cholesteric liquid crystal layer will be described.

As a material used for formation of the cholesteric liquid crystal layer, a liquid crystal composition including a polymerizable liquid crystal compound and a chiral agent (optically active compound) is used. The liquid crystal composition with a surfactant, a polymerization initiator, or the like being further mixed and dissolved in a solvent or the like, as necessary, is applied to a support, an alignment layer, and a cholesteric liquid crystal layer to serve as an underlayer. After cholesteric alignment is matured, the alignment can be immobilized by curing of the liquid crystal composition to form a cholesteric liquid crystal layer.

(Polymerizable Liquid Crystal Compound)

The polymerizable liquid crystal compound may be a rod-shaped liquid crystal compound or a disk-like liquid crystal compound, and a rod-shaped liquid crystal compound is preferable.

As an example of the rod-shaped polymerizable liquid crystal compound for forming the cholesteric liquid crystal layer, a rod-shaped nematic liquid crystal compound is used. As the rod-shaped nematic liquid crystal compound, an azomethine compound, an azoxy compound, a cyanobiphenyl compound, a cyanophenyl ester compound, a benzoic acid ester compound, a cyclohexanecarboxylic acid phenyl ester compound, a cyanophenylcyclohexane compound, a cyano-substituted phenylpyrimidine compound, an alkoxy-substituted phenylpyrimidine compound, a phenyldioxane compound, a tolane compound, or an alkenylcyclohexylbenzonitrile compound is preferably used. Not only a low-molecular-weight liquid crystal compound but also a polymer liquid crystal compound can be used.

The polymerizable liquid crystal compound is obtained by introducing a polymerizable group into the liquid crystal compound. The examples of a polymerizable group include an unsaturated polymerizable group, an epoxy group, an aziridinyl group, and an unsaturated polymerizable group is preferable, and an ethylenically unsaturated polymerizable group is particularly preferable. The polymerizable group can be introduced into the molecules of the liquid crystal compound using various methods. The number of polymerizable groups having the polymerizable liquid crystal compound is preferably 1 to 6 and more preferably 1 to 3 per molecule.

Examples of the polymerizable liquid crystal compound include compounds disclosed in Makromol. Chem., vol. 190, pp. 2255 (1989), Advanced Material, vol. 5, pp. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1994-016616A (JP-H06-016616A), JP1995-110469A (JP-H07-110469A), JP1999-080081A (JP-H11-080081A), JP2001-328973A, and the like. Two or more polymerizable liquid crystal compounds may be used in combination. In a case where two or more kinds of polymerizable liquid crystal compounds are used in combination, an alignment temperature can be decreased.

The addition amount of the polymerizable liquid crystal compound contained in the liquid crystal composition is preferably 80% to 99.9% by mass, more preferably 85% to 99.5% by mass, and even more preferably 90% to 99% by mass with respect to the mass of solid content (the mass excluding a solvent) in the liquid crystal composition.

In order to improve the visible light transmittance, the cholesteric liquid crystal layer may have a low $\Delta n$. The cholesteric liquid crystal layer having a low $\Delta n$ can be formed by using a low $\Delta n$ polymerizable liquid crystal compound. Hereafter, the low-$\Delta n$ polymerizable liquid crystal compound will be specifically described.

(Low-$\Delta n$ Polymerizable Liquid Crystal Compound)

A cholesteric liquid crystalline phase is formed by using the low-$\Delta n$ polymerizable liquid crystal compound, and the cholesteric liquid crystalline phase is immobilized to form a film, thereby obtaining a narrow-band selective reflection layer. Examples of the polymerizable liquid crystal compounds having a low $\Delta n$ include compounds described in WO2015/115390A, WO2015/147243A, WO2016/035873A, JP2015-163596A, and JP2016-053149A. Regarding the liquid crystal composition to provide a selective reflection layer having a small half-width, WO2016/047648A can be referred to.

It is also preferable that the liquid crystal compound is a polymerizable compound represented by Formula (I) described in WO2016/047648A.

$$Q^1—Sp^1—\left[A—L\right]_{m-1}—A—Sp^2—Q^2 \tag{I}$$

In Formula (I), A represents a phenylene group which may have a substituent or a trans-1,4-cyclohexylene group which may have a substituent, L represents a single bond, $—CH_2O—$, $—OCH_2—$, $—(CH_2)_2OC(=O)—$, $—C(=O)O$ $(CH_2)_2$—, —C(═O)O—, —OC(═O)—, —OC(═O)O—, —CH═CH—C(═O)O—, or —OC(═O)—CH═CH—, m represents an integer of 3 to 12, $Sp^1$ and $Sp^2$ each independently represent a single bond, a linear or branched alkylene group having 1 to 20 carbon atoms, or a group in which one or two or more —$CH_2$—'s in a linear or branched alkylene group having 1 to 20 carbon atoms are substituted with a group selected from —O—, —S—, —NH—, —$N(CH_3)$—, —C(═O)—, —OC(═O)—, and —C(═O)O—, and $Q^1$ and $Q^2$ each independently represent a hydrogen atom or a polymerizable group represented by any of Formulae Q-1 to Q-5. However, at least any one of $Q^1$ or $Q^2$ represents a polymerizable group. In the following formulae, * represents a bonding site.

Q-1

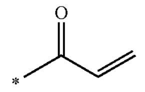

Q-2

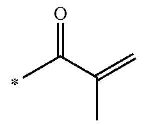

Q-3

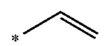

Q-4

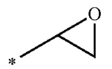

Q-5

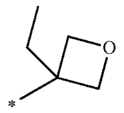

In Formula (I), the phenylene group is preferably a 1,4-phenylene group.

Regarding the phenylene group and the trans-1,4-cyclohexylene group, the substituent in a case of "may have a substituent" is not particularly limited, and examples thereof include an alkyl group, a cycloalkyl group, an alkoxy group, an alkoxycarbonyl group, an amide group, an amino group, a halogen atom, and a group formed by combining two or more of the above substituents. In addition, examples of the substituent include a substituent represented by —C(═O)-$X^3$-$Sp^3$-$Q^3$ described later. In a case where the phenylene group and the trans-1,4-cyclohexylene group have substituents, 1 to 4 substituents may be included. In a case where the phenylene group and the trans-1,4-cyclohexylene group have two or more substituents, two or more substituents may be the same as or different from each other.

The alkyl group may be linear or branched. The number of carbon atoms of the alkyl group is preferably 1 to 30, more preferably 1 to 10, and even more preferably 1 to 6. Examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethylpropyl group, an n-hexyl group, and an isohexyl group; and a heptyl group, an octyl group, a nonyl group, a decyl group, an undecyl group, and a dodecyl group which are a linear or branched. The above description regarding the alkyl group is also applied to an alkoxy group and an alkoxycarbonyl group, which include an alkyl group. Specific examples of the alkylene group which is referred to as an alkylene group include a divalent group obtained by removing any one hydrogen atom from each of the above examples of the alkyl group. Examples of the halogen atom include a fluorine atom, a chlorine atom, a bromine atom, and an iodine atom.

The number of carbon atoms in the cycloalkyl group is preferably 3 to 20, the lower limit value is more preferably 5 or more, and the upper limit value is more preferably 10 or less, even more preferably 8 or less, and particularly preferably 6 or less. Examples of the cycloalkyl group include a cyclopropyl group, a cyclobutyl group, a cyclopentyl group, a cyclohexyl group, a cycloheptyl group, and a cyclooctyl group.

As the substituents that the phenylene group and the trans-1,4-cyclohexylene group may have, an alkyl group, an alkoxy group, or —C(═O)—$X^3$-$Sp^3$-$Q^3$ is particularly preferable. Here, $X^3$ represents a single bond, —O—, —S—, or —N($Sp^4$-$Q^4$)-, or represents a nitrogen atom forming a ring structure together with $Q^3$ and $Sp^3$. $Sp^3$ and $Sp^4$ each independently represent a single bond, a linear or branched alkylene group having 1 to 20 carbon atoms, or a group in which one or two or more —$CH_2$—'s in the linear or branched alkylene group having 1 to 20 carbon atoms are substituted with a group selected from —O—, —S—, —NH—, —$N(CH_3)$—, —C(═O)—, —OC(═O)—, or C(═O)O—.

$Q^3$ and $Q^4$ each independently represent a hydrogen atom, a cycloalkyl group, a group in which one or two or more —$CH_2$—'s in a cycloalkyl group are substituted with a group selected from —O—, —S—, —NH—, —$N(CH_3)$—, —C(═O)—, —OC(═O)—, —C(═O)O—, or a polymerizable group represented by any of Formulae Q-1 to Q-5.

Specific examples of the group in which one or two or more —$CH_2$—'s in the cycloalkyl group are substituted with a group selected from —O—, —S—, —NH—, —$N(CH_3)$—, —C(═O)—, —OC(═O)—, or —C(═O)O— include a tetrahydrofuranyl group, a pyrrolidinyl group, an imidazolidinyl group, a pyrazolidinyl group, a piperidyl group, a piperazinyl group, a morpholinyl group, and the like. The substitution position is not particularly limited. Among these, a tetrahydrofuranyl group is preferable, and a 2-tetrahydrofuranyl group is particularly preferable.

In Formula (I), L represents a single bond, —$CH_2O$—, —$OCH_2$—, —$(CH_2)_2OC$(═O)—, —C(═O)O$(CH_2)_2$—, —C(═O)O—, —OC(═O)—, —OC(═O)O—, —CH═CH—C(═O)O—, or —OC(═O)—CH═CH—. L is preferably —C(═O)O— or —OC(═O)—. m-1 pieces of L's may be the same as or different from each other.

$Sp^1$ and $Sp^2$ each independently represent a single bond, a linear or branched alkylene group having 1 to 20 carbon atoms, or a group in which one or two or more —$CH_2$—'s in the linear or branched alkylene group having 1 to 20 carbon atoms are substituted with a group selected from —O—, —S—, —NH—, —$N(CH_3)$—, —C(═O)—, —OC(═O)—, or C(═O)O—.

It is preferable that $Sp^1$ and $Sp^2$ each independently represent —OC(═O)—, —C(═O)O—, —O—, or a linear alkylene group having 1 to 10 carbon atoms, or a linking group formed by combining two or more of these groups.

Examples of the linking group formed by combining two or more of —OC(═O)—, —C(═O)O—, —O—, or a linear alkylene group having 1 to 10 carbon atoms include a linear alkylene group having 1 to 10 carbon atoms in which a linking group selected from —O—, —OC(═O)—, and —C(═O)O— is bonded to each of both terminals (that is, a group in which —O—, —OC(═O)—, or —C(═O)O— is bond to each of both terminals of the linear alkylene group having 1 to 10 carbon atoms).

It is more preferable that $Sp^1$ and $Sp^2$ are a group in which —O— is bonded to a terminal on a side bonded to $Q^1$ or $Q^2$ among both ends of a linear alkylene group having 1 to 10 carbon atoms, and —O—, —OC(═O)—, or —C(═O)O— is bonded to the other terminal.

$Q^1$ and $Q^2$ each independently represent a hydrogen atom or a polymerizable group represented by any of Formulae Q-1 to Q-5. However, at least any one of $Q^1$ and $Q^2$ represents a polymerizable group, and both of them are preferably polymerizable groups.

The polymerizable group is preferably an acryloyl group (Formula Q-1) or a methacryloyl group (Formula Q-2).

In Formula (I), m represents an integer of 3 to 12. m preferably represents an integer of 3 to 9, more preferably represents an integer of 3 to 7, and even more preferably represents an integer of 3 to 5.

The polymerizable compound represented by Formula (I) preferably includes at least one phenylene group which may have a substituent as A and at least one trans-1,4-cyclohexylene group which may have a substituent.

The polymerizable compound represented by Formula (I) preferably includes 1 to 4 trans-1,4-cyclohexylene groups which may have a substituent as A, and more preferably 1 to 3 trans-1,4-cyclohexylene groups. In addition, the polymerizable compound represented by Formula (I) preferably includes 1 or more phenylene groups which may have a substituent as A, and more preferably 1 to 4 phenylene groups.

In Formula (I), in a case where a number obtained by dividing the number of trans-1,4-cyclohexylene groups represented by A by m is determined as mc, mc preferably satisfies $0.1<mc<0.9$, more preferably satisfies $0.3<mc<0.8$, and even more preferably satisfies $0.5<mc<0.7$. The liquid crystal composition preferably includes a polymerizable compound represented by Formula (I) in a range of $0.5<mc<0.7$, and a polymerizable compound represented by Formula (I) in a range of $0.1<mc<0.3$.

Specific examples of the polymerizable compound represented by Formula (I) include compounds described in paragraphs 0051 to 0058 of WO2016/047648A, compounds described in JP2013-112631A, JP2010-070543A, JP4725516B, WO2015/115390A, WO2015/147243A, WO2016/035873A, JP2015-163596A, and JP2016-053149A, or the like.

The liquid crystal composition forming the cholesteric liquid crystal layer having a low Δn may contain a polymerizable liquid crystal compound (hereinafter, referred to as "other polymerizable liquid crystal compounds") other than the polymerizable compound represented by Formula (I) described above.

Examples of the other polymerizable liquid crystal compounds can include a polymerizable liquid crystal compound other than the polymerizable compound represented by Formula (I) described above among the compounds described as examples of the polymerizable liquid crystal compound.

In the liquid crystal composition forming the low Δn cholesteric liquid crystal layer, the proportion of the polymerizable compound represented by Formula (I) described above in the total amount of the polymerizable liquid crystal compound is preferably 30% to 100% by mass, more preferably 50% to 100% by mass, and even more preferably 70% to 100% by mass.

(Chiral Agent: Optically Active Compound)

The chiral agent has a function of inducing a helical structure of the cholesteric liquid crystalline phase. Chiral agents may be selected according to the purpose because induced helical senses or helical pitches are different depending on compounds.

The chiral agent is not particularly limited and normal compounds can be used. Examples of chiral agents include compounds described in Liquid Crystal Device Handbooks (Chapter 3, 4-3, Chiral Agents for TN and STN, p. 199, edited by Japan Society for the Promotion of Science, 142 Committee, 1989), JP2003-287623A, JP2002-302487A, JP2002-080478A, JP2002-080851A, JP2010-181852, or JP2014-034581A.

The chiral agent generally includes asymmetric carbon atoms. However, an axially asymmetric compound or a planar asymmetric compound, which does not have asymmetric carbon atoms, can also be used as a chiral agent.

Examples of the axially asymmetric compound or the planar asymmetric compound include binaphthyl, helicene, paracyclophane, and derivatives thereof. The chiral agent may also have a polymerizable group. In a case where both the chiral agent and the liquid crystal compound contain polymerizable groups, a polymer that includes a repeating unit derived from a polymerizable liquid crystal compound and a repeating unit derived from the chiral agent can be formed by a polymerization reaction of a polymerizable chiral agent and the polymerizable liquid crystal compound. In this aspect, the polymerizable group contained in the polymerizable chiral agent is preferably the same group as the polymerizable group contained in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

As the chiral agent, an isosorbide derivative, an isomannide derivative, or a binaphthyl derivative can be preferably used. As the isosorbide derivative, a commercially available product such as LC-756 (trade name) manufactured by BASF may be used.

A content of the chiral agent in the liquid crystal composition is preferably 0.01% to 200% by mol and more preferably 1% to 30% by mol, with respect to the amount of the polymerizable liquid crystal compound.

In addition, as described above, the cholesteric liquid crystal layer of the selective reflection layer included in the linearly polarized light reflection film may have two or more selective reflection central wavelengths. A cholesteric liquid crystal layer having two or more selective reflection central wavelengths is achieved by causing pitches of the helical structure to be changed in a thickness direction. The irradiation amount of light can be changed in the thickness direction to produce the cholesteric liquid crystal layer in which the pitches of the helical structure change in the thickness direction by using a chiral agent with helical twisting power (HTP) changing upon irradiation with light.

In addition, examples of the chiral agent with the HTP changing upon irradiation with light include a chiral agent that causes return isomerization, dimerization, isomerization and dimerization, and the like upon irradiation with light.

In a case where the chiral agent has a photoisomerization group, the photoisomerization group is preferably an isomerization moiety, an azo group, an azoxy group, or a cinnamoyl group of a compound exhibiting photochromic properties. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

(Polymerization Initiator)

The liquid crystal composition preferably includes a polymerization initiator. In an aspect of carrying out a polymerization reaction with ultraviolet light irradiation, the polymerization initiator used is preferably a photopolymerization initiator capable of starting a polymerization reaction with ultraviolet light irradiation.

Examples of the photopolymerization initiator include α-carbonyl compounds (described in each specification of U.S. Pat. Nos. 2,367,661A and 2,367,670A), acyloin ether compounds (described in U.S. Pat. No. 2,448,828A), α-hydrocarbon-substituted aromatic acyloin compounds (described in U.S. Pat. Nos. 2,722,512A), polynuclear quinone compounds (described in U.S. Pat. Nos. 3,046,127A and 2,951,758A), combinations of a triarylimidazole dimer and a p-aminophenylketone (described in U.S. Pat. No. 3,549,367A), acridine and phenazine compounds (described in JP1985-105667A (JP-S60-105667A), U.S. Pat. No. 4,239,850A), acylphosphine oxide compounds (described in JP1988-040799B (JP-S63-040799B), JP1993-029234B (JP-H5-029234B), JP1998-095788A (JP-H10-095788A), JP1998-029997A (JP-H10-029997A), JP2001-233842A, JP2000-080068A, JP2006-342166A, JP2013-114249A, JP2014-137466A, JP4223071B, JP2010-262028A, JP2014-500852), oxime compounds (described in JP2000-066385A and JP4454067B), and oxadiazole compounds (described in U.S. Pat. No. 4,212,970A), and the like. For example, the description of paragraphs 0500 to 0547 of JP2012-208494A can also be referred to.

As the polymerization initiator, it is also preferable to use the acylphosphine oxide compounds or the oxime compounds.

As the acylphosphine oxide compounds, for example, IRGACURE 810 (trade name, compound name: bis(2,4,6-trimethylbenzoyl)-phenylphosphine oxide) which is a commercially available product and manufactured by BASF Japan Ltd. can be used. As the oxime compound, a commercially available product such as IRGACURE OXE01 (trade name, manufactured by BASF SE), IRGACURE OXE02 (trade name, manufactured by BASF SE), TR-PBG-304 (trade name, manufactured by Changzhou Tronly New Electronic Materials Co., Ltd.), ADEKA ARKLS NCI-930 (trade name, manufactured by Adeka Corporation), ADEKA ARKLS NCI-831 (trade name, manufactured by Adeka Corporation), and the like can be used.

The polymerization initiators may be used alone or in combination of two or more kinds.

A content of the photopolymerization initiator in the liquid crystal composition is preferably 0.1% to 20% by mass and more preferably 0.5% to 5% by mass, with respect to a content of the polymerizable liquid crystal compound.

(Crosslinking Agent)

In order to improve a film hardness after curing and to improve durability, the liquid crystal composition may include any crosslinking agent. The crosslinking agent which is cured with ultraviolet light, heat, or moisture can be suitably used.

The crosslinking agent is not particularly limited, and can be appropriately selected according to the purpose. Examples of the crosslinking agent include a polyfunctionalacrylate compound such as trimethylolpropane tri(meth)acrylate, or pentaerythritol tri(meth)acrylate; an epoxy compound such as glycidyl (meth)acrylate, or ethylene glycol diglycidyl ether; an aziridine compound such as 2,2-bishydroxymethylbutanol-tris [3-(1-aziridinyl) propionate], or 4,4-bis(ethyleneiminocarbonylamino) diphenylmethane; an isocyanate compound such as hexamethylene diisocyanate or biuret type isocyanate; a polyoxazoline compound including an oxazoline group in a side chain; and an alkoxysilane compound such as vinyltrimethoxysilane or N-(2-aminoethyl) 3-aminopropyltrimethoxysilane. Furthermore, according to the reactivity of the crosslinking agent, a normal catalyst can be used, and the productivity can be improved in addition to the improvement of film hardness and durability. These may be used alone or in combination.

The content of the crosslinking agent in the liquid crystal composition is preferably 3% to 20% by mass and more preferably 5% to 15% by mass with respect to the mass of solid contents in the liquid crystal composition (the mass excluding the solvent). By setting the content of the crosslinking agent to 3% by mass or more, the effect of improving a crosslinking density can be obtained, and by setting the content of the crosslinking agent 20% by mass or less, a reduction in the stability of the cholesteric liquid crystal layer can be prevented.

The term "(meth)acrylate" is used in the meanings of "either one of or both of acrylate and methacrylate".

(Alignment Control Agent)

An alignment control agent which contributes to stably or rapidly setting the cholesteric liquid crystal layer as a cholesteric liquid crystal layer having planar alignment, may be added into the liquid crystal composition. Examples of the alignment control agent include a fluorine (meth)acrylate-based polymer disclosed in paragraphs [0018] to [0043] of JP2007-272185A, compounds represented by Formulae (I) to (IV) disclosed in paragraphs [0031] to [0034] of JP2012-203237, and compounds disclosed in JP2013-113913.

The alignment control agent may be used singly or in combination of two or more kinds thereof.

The amount of the alignment control agent added into the liquid crystal composition is preferably 0.01% to 10% by mass, more preferably 0.01% to 5% by mass, and particularly preferably 0.02% to 1% by mass, with respect to the total mass of the polymerizable liquid crystal compound.

(Other Additives)

In addition, the liquid crystal composition may include at least one kind selected from various additives such as a surfactant for adjusting the surface tension of a coating film and setting an even film thickness, a polymerizable monomer, and the like. Further, a polymerization inhibitor, an antioxidant, an ultraviolet absorber, a light stabilizer, a coloring material, and metal oxide fine particles may be further added into the liquid crystal composition, as necessary, in a range not deteriorating the optical performance.

Regarding the cholesteric liquid crystal layer, a cholesteric liquid crystal layer having immobilized cholesteric regularity can be formed according to the following procedure of: applying a liquid crystal composition, in which a polymerizable liquid crystal compound, a polymerization initiator, and as necessary, a chiral agent, a surfactant, or other agents are dissolved in a solvent, onto a transparent substrate, a retardation layer, an alignment layer, or a cholesteric liquid crystal layer which is produced in advance; drying the liquid crystal composition to obtain a coating film, and irradiating this coating film with an actinic ray to carry out the polymerization of a cholesteric liquid crystalline composition.

In addition, a laminated film consisting of a plurality of the cholesteric liquid crystal layers can be formed by the above-described steps for manufacturing the cholesteric liquid crystal layer being repeatedly carried out.

(Solvent)

A solvent used for preparing the liquid crystal composition is not particularly limited, and is appropriately selected according to the purpose, and an organic solvent is preferably used.

The organic solvent is not particularly limited, and is appropriately selected according to the purpose, and examples thereof include ketones, alkyl halides, amides, sulfoxides, heterocyclic compounds, hydrocarbons, esters, and ethers. These may be used alone or in combination. Among these, a ketone is more preferable in consideration of an environmental burden.

(Coating, Alignment, and Polymerization)

A coating method of the transparent substrate, the alignment layer, the cholesteric liquid crystal layer serving as an underlayer, and other layers with the liquid crystal composition is not particularly limited, and can be appropriately selected in accordance with the purpose. Examples of the coating method include wire bar coating, curtain coating, extrusion coating, direct gravure coating, reverse gravure coating, die coating, spin coating, dip coating, spray coating, slide coating, and the like. In addition, a method of transferring the liquid crystal composition which is separately applied onto a support can also be implemented.

Liquid crystal molecules are aligned by heating the coated liquid crystal composition. A heating temperature is preferably 200° C. or lower and more preferably 130° C. or lower. By this alignment treatment, an optical thin film in which the polymerizable liquid crystal compound is twist-aligned so as to have a helical axis in a direction substantially perpendicular to a film surface is obtained.

The aligned liquid crystal compound is further polymerized and thereby the liquid crystal composition can be cured. The polymerization may be any of thermal polymerization or photopolymerization with light irradiation, and photopolymerization is preferable. The light irradiation is preferably performed by using ultraviolet light. The irradiation energy is preferably 20 $mJ/cm^2$ to 50 $J/cm^2$ and more preferably 100 to 1,500 $mJ/cm^2$.

In order to accelerate the photopolymerization reaction, the light irradiation may be performed under heating conditions or in a nitrogen atmosphere. The wavelength of ultraviolet light-irradiated is preferably 350 to 430 nm. A high polymerization reaction rate is preferable, and specifically, a reaction rate is preferably 70% or more and more preferably 80% or more, from a viewpoint of stability. The polymerization reaction rate can be determined by measuring the consumption rate of polymerizable functional groups using an infrared absorption spectrum.

[Polarization Conversion Layer]

The polarization conversion layer 14 is preferably a layer with a helical alignment structure of the liquid crystal compound, which is immobilized, and the number of pitches x of the helical alignment structure and a film thickness y (unit: μm) of the polarization conversion layer satisfy all of Relational Expressions (a) to (c) as follows.

$$0.1 \le x \le 1.0 \quad \text{Expression (a)}$$

$$0.5 \le y \le 3.0 \quad \text{Expression (b)}$$

$$3{,}000 \le (1{,}560 \times y)/x \le 50{,}000 \quad \text{Expression (c)}$$

One pitch of the helical structure of the liquid crystal compound is one turn of a helix of the liquid crystal compound.

That is, the number of pitches in a state in which the director (the long axis direction in the case of a rod-shaped liquid crystal) of the helically aligned liquid crystal compound is rotated by 360° is defined as 1.

In a case where the polarization conversion layer has the helical structure of the liquid crystal compound, the polarization conversion layer exhibits optical rotation properties and birefringence with respect to visible light having a wavelength shorter than a reflection peak wavelength in the infrared region. Therefore, the polarized light in the visible range can be controlled. By setting the pitch number x of the helical alignment structure of the polarization conversion layer and the film thickness y of the polarization conversion layer within the above ranges, a function of optically compensating the visible light with the polarization conversion layer or a straight line incident on the reflection film A function of converting linearly polarized light (p-polarized light) into circularly polarized light can be provided.

The polarization conversion layer exhibits optical rotation properties and birefringence with respect to visible light because the liquid crystal compound has the helical structure satisfying Relational Expressions (a) to (c). Particularly, by setting the pitch P of the helical structure of the polarization conversion layer to have a length corresponding to the pitch P of the cholesteric liquid crystal layer in which the selective reflection central wavelength is within the long wavelength infrared region, it is possible to exhibit high optical rotation properties and birefringence with respect to visible light having a short wavelength.

Relational Expression (a) is "0.1≤x≤1.0".

In a case where the number of pitches x of the helical structure is less than 0.1, disadvantages, such as insufficient optical rotation properties and birefringence, are caused.

In addition, in a case where the number of pitches x of the helical structure is more than 1.0, disadvantages that optical rotation properties and birefringence are excessive, and desired elliptical polarized light cannot be obtained are caused.

Relational Expression (b) is "0.5≤y≤3.0".

In a case where the thickness y of the polarization conversion layer is less than 0.5 μm, the film thickness is too thin, disadvantages, such as insufficient optical rotation properties and birefringence, are caused.

In a case where the thickness y of the polarization conversion layer is more than 3.0 μm, disadvantages that optical rotation properties and birefringence are excessive, desired circularly polarized light cannot be obtained, and poor alignment is likely to occur, which is not preferable for production, are caused.

Relational Expression (c) is "3,000≤(1,560×y)/x≤50,000".

In a case where "(1,560×y)/x" is less than 3,000, disadvantages that optical rotation properties are excessive, and desired polarized light cannot be obtained are caused.

In a case where "(1,560×y)/x" is more than 50,000, disadvantages that optical rotation properties are insufficient, and desired polarized light cannot be obtained are caused.

In the present invention, the number of pitches x of the helical structure of the polarization conversion layer is more preferably 0.1 to 0.8, and the film thickness y is more preferably 0.6 μm to 2.6 μm. In addition, "(1,560×y)/x" is more preferably 5,000 to 13,000.

That is, it is preferable that the polarization conversion layer has a long pitch P of the helical structure and a small number of pitches x.

Specifically, in the polarization conversion layer, it is preferable that the helical pitch P is equal to a pitch P of the cholesteric liquid crystal layer in which the selective reflection central wavelength is within the long wavelength infrared region, and the number of pitches x is small. More specifically, in the polarization conversion layer, it is preferable that the helical pitch P is equal to a pitch P of the cholesteric liquid crystal layer in which the selective reflection central wavelength is within 3000 to 10000 nm, and the number of pitches x is small.

Since the selective reflection central wavelength corresponding to the pitch P in the polarization conversion layer is much longer than that of visible light, the above described optical rotation properties and birefringence with respect to visible light are more suitably exhibited.

The polarization conversion layer can be basically formed in the same manner as a normal cholesteric liquid crystal layer. However, during the formation of the polarization conversion layer, it is necessary to adjust the liquid crystal compound to be used, the chiral agent to be used, the amount of the chiral agent added, the film thickness, and the like so that the number of pitches x and the film thickness y [μm] of the helical structure in the polarization conversion layer satisfy all of Relational Expressions (a) to (c).

<Layer with Helical Alignment Structure (Helical Structure) of Liquid Crystal Compound, Which is Immobilized>

The layer with a helical alignment structure (helical structure) of the liquid crystal compound, which is immobilized, is a so-called cholesteric liquid crystal layer, and means a layer in which a cholesteric liquid crystalline phase is immobilized.

The cholesteric liquid crystal layer may be any layer as long as the alignment of a liquid crystal compound serving as the cholesteric liquid crystalline phase is maintained. The cholesteric liquid crystal layer may be typically a layer in which the polymerizable liquid crystal compound may be brought into the alignment state of a cholesteric liquid crystalline phase and polymerized and cured by ultraviolet light irradiation, heating, and the like to form a layer that has no fluidity and also whose alignment is not changed by an external field or an external force. In the cholesteric liquid crystal layer, it is sufficient that optical properties of the cholesteric liquid crystalline phase are maintained in the layer, and the liquid crystal compound in the layer may not exhibit liquid crystal properties anymore. For example, the polymerizable liquid crystal compound may have high molecular weight due to a curing reaction and may already lose liquid crystal properties.

As described above, a central wavelength λ of selective reflection (selective reflection central wavelength) by the cholesteric liquid crystal layer depends on a pitch P (=a period of a helix) of a helical structure (helical alignment structure) in the cholesteric liquid crystalline phase, and is based on a relationship between an average refractive index n of the cholesteric liquid crystal layer and λ=n×P. As is clear from the above Expression, the selective reflection central wavelength can be controlled by adjusting the n value and/or the P value.

The helical pitch of the cholesteric liquid crystalline phase depends on the type of chiral agents used together with the polymerizable liquid crystal compound and the addition concentration thereof. Thus, a desired pitch can be obtained by adjusting the type and the addition concentration.

As described above, in the cholesteric liquid crystal layer used as the polarization conversion layer, the helical pitch is adjusted so that the selective reflection central wavelength is within the infrared region at a long wavelength.

The method for forming the cholesteric liquid crystal layer as the polarization conversion layer is basically the same as the above-described method for forming the cholesteric liquid crystal layer.

[Retardation Layer]

In the retardation layer, a phase difference (optical path difference) is added to two orthogonal polarized light components to change the state of the incident polarized light.

In a case where the retardation layer is arranged on the outside of the vehicle and optically compensates, a front phase difference of the retardation layer may be a phase difference that can optically compensate.

In this case, the retardation layer preferably has a front retardation of 50 nm to 160 nm at a wavelength of 550 nm.

In addition, in a case where the windshield glass having the reflection film is mounted in the vehicle, and a direction corresponding to the upper vertical direction of a surface of the second glass plate is 0°, an angle of the slow axis is preferably 10° to 50° or −50° to −10°.

In addition, in a case where the retardation layer converts linearly polarized light into circularly polarized light, the retardation layer is preferably configured to provide λ/4 as the front phase difference, and may be configured to provide 3 λ/4 as the front phase difference. In addition, the angle of the slow axis may be arranged to change the incident linearly polarized light into circularly polarized light.

In this case, for example, the front phase difference of the retardation layer at a wavelength of 550 nm is preferably in a range of 100 to 450 nm, and more preferably in a range of 120 to 200 nm or 300 to 400 nm. In addition, in a case where the reflection film 10 is used in a head-up display system, the direction of the slow axis of the retardation layer is preferably determined in accordance with the incident direction of projection light for displaying projection images and the helical sense of the cholesteric liquid crystal layer constituting the selective reflection layer.

The retardation layer is not particularly limited, and can be appropriately selected according to the purpose. Examples of the retardation layer include a stretched polycarbonate film, a stretched norbornene-based polymer film, a transparent film in which inorganic particles having birefringence such as strontium carbonate are included and aligned, a thin film in which oblique deposition of an inorganic dielectric is performed on a support, a film in which the polymerizable liquid crystal compound is uniaxially aligned and the alignment is immobilized, a film in which the liquid crystal compound is uniaxially aligned and the alignment is immobilized, and the like.

Among these, the retardation layer is suitably a film obtained by uniaxially aligning and immobilizing a polymerizable liquid crystal compound.

As an example, the retardation layer can be formed in the following order. A liquid crystal composition including a polymerizable liquid crystal compound is applied on a transparent substrate, a temporary support or the surface of the alignment layer, the polymerizable liquid crystal compound in the liquid crystal composition is formed in a nematic alignment in a liquid crystal state, and then the polymerizable liquid crystal compound is immobilized by curing to form the retardation layer.

In this case, the formation of the retardation layer can be carried out in the same manner as the formation of the cholesteric liquid crystal layer, except that no chiral agent is added to the liquid crystal composition. However, during the formation of the nematic alignment after applying the liquid crystal composition, the heating temperature is preferably 50° C. to 120° C., and more preferably 60° C. to 100° C.

The retardation layer may be a layer formed by applying a composition including a high-molecular liquid crystal compound on the transparent substrate, the temporary support, the surface of the alignment layer or the like, forming the nematic alignment in a liquid crystal state, cooling the composition, and then obtained by immobilizing the alignment.

The thickness of the retardation layer is not limited, but is preferably 0.2 to 300 μm, more preferably 0.5 to 150 μm, and even more preferably 1.0 to 80 μm. The thickness of the retardation layer formed of the liquid crystal composition is not particularly limited, and is preferably 0.2 to 10 μm, more preferably 0.5 to 5.0 μm, and even more preferably 0.7 to 2.0 μm.

In the retardation layer, for example, a slow axis inclined at an angle α is set with respect to an axis of the retardation layer in any direction. The direction of the slow axis can be set by, for example, rubbing treatment on an alignment film serving as the underlayer of the retardation layer.

The linearly polarized light reflection film may include a layer in addition to the selective reflection layer, the polarization conversion layer, and the retardation layer, which are described above. For example, the linearly polarized light reflection film may include a transparent substrate, an adhesive layer, or the like.

For example, in the example illustrated in FIG. 2, the linearly polarized light reflection film 10A includes the transparent substrate 18 that is arranged on the side opposite to the selective reflection layer 11 of the retardation layer 16. The transparent substrate 18 supports the retardation layer 16, the selective reflection layer 11 (cholesteric liquid crystal layer), and the polarization conversion layer 14. The transparent substrate 18 may be used to as a support for forming the retardation layer 16, the selective reflection layer 11 (cholesteric liquid crystal layer), and the polarization conversion layer 14.

The linearly polarized light reflection film may have a thin film-shape, a sheet-shape, or the like. The linearly polarized light reflection film may have a roll-shape as a thin film before used for the windshield glass.

All of the transparent substrate (support), the adhesive layer, and the like are preferably transparent in the visible light range.

In addition, all of the transparent substrate, the adhesive layer, and the like preferably have low birefringence. The term "low birefringence" means that a front phase difference in a wavelength range where the selective reflection layer included in the windshield glass used in the present invention exhibits the reflection is 10 nm or less. This front phase difference is preferably 5 nm or less. Furthermore, all of the support, the adhesive layer, and other components preferably have a small difference in a refractive index from the average refractive index (in-plane average refractive index) of the selective reflection layer.

[Transparent Substrate]

The transparent substrate can also be used as a basal plate for forming the selective reflection layer. The transparent substrate used for forming the selective reflection layer may be a temporary support that is peeled off after the formation of the selective reflection layer. Therefore, the transparent substrate may not be included in the completed reflection film and windshield glass. In a case where the completed reflection film or windshield glass includes the transparent substrate instead of peeling off as the temporary support, the transparent substrate is preferably transparent in the visible light range.

Materials of the transparent substrate are not limited. Examples of the transparent substrate include plastic films of polyester such as polyethylene terephthalate (PET), polycarbonate, an acrylic resin, an epoxy resin, polyurethane, polyamide, polyolefin, cellulose derivative, and silicone. As the temporary support, glass may be used in addition to the plastic films.

A thickness of the transparent substrate may be approximately 5.0 to 1000 μm, is preferably 10 to 250 μm, and more preferably 15 to 90 μm.

Here, as the example illustrated in FIG. 2, in a case where the transparent substrate 18 is arranged on the first glass plate 30 side, that is, arranged on the outside of the vehicle, the transparent substrate 18 preferably contains an ultraviolet absorber.

In a case where the transparent substrate 18 contains the ultraviolet absorber, deterioration of the reflection film (selective reflection layer) by ultraviolet light can be suppressed.

[1-2] Linearly Polarized Light Reflection Film Including Dielectric Multi-Layer Film FIG. 3 is a schematic diagram showing an example of the windshield glass used in the present invention, and the linearly polarized light reflection film 10B included in the windshield glass 24B is formed of a selective reflection layer (dielectric multi-layer film) in which optically anisotropic layers (13Ra, 13Ga, 13Ba) and optically isotropic layers (13Rb, 13Gb, 13Ba) are alternately laminated. In the example shown in the drawing, the linearly polarized light reflection film 10B includes a first laminated portion 13R in which an optically isotropic layer 13Ra and an optically anisotropic layer 13Rb are alternately laminated, a second laminated portion 13G in which an optically isotropic layer 13Ga and an optically anisotropic layer 13Gb are alternately laminated, and a third laminated portion 13B in which an optically isotropic layer 13Ba and an optically anisotropic layer 13Bb are alternately laminated.

The dielectric multi-layer film is not particularly limited as long as the dielectric multi-layer film includes three wavelengths of $\lambda_B$, $\lambda_G$, and $\lambda_R$ described above as selective reflection central wavelengths at a light incidence angle of 60°, and satisfies all of the regulations (a) to (c) described above between respective color laser beams in the laser light source.

In the first laminated portion 13R, the second laminated portion 13G, and the third laminated portion 13B, the thicknesses of the optically anisotropic layer and the thicknesses of the optically isotropic layer are different from each other. In addition, the number of laminated layers, the refractive index, and the like may be different.

In addition, in the linearly polarized light reflection film, the refractive indexes nei in the slow axis direction of the optically anisotropic layer exceed the refractive indexes $n_{o2}$ of the optically isotropic layer (that is, $n_{e1}>n_{o2}$), and the refractive indexes $n_{o1}$ in the direction orthogonal to the slow axis of the optically anisotropic layer are substantially the same as the refractive indexes $n_{o2}$ of the optically isotropic layer.

Figure 4:
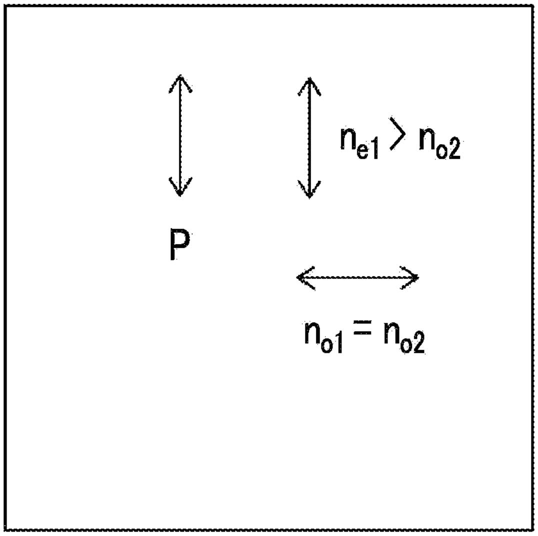
FIG. 4 is a schematic view showing the relationship between the refractive indices of the linearly polarized light reflection film in a case where the windshield glass of FIG. 3 is viewed from the front.

A plurality of the optically anisotropic layers are laminated so that the slow axes of the optically anisotropic layers parallel to each other. Therefore, as shown in FIG. 4, in a certain direction (vertical direction in FIG. 4), layers each of which has the high refractive index ($n_{e1}$) and layers each of which has the low refractive index ($n_{o2}$) are laminated. On the other hand, the layers having the same refractive indexes are laminated in a direction (left-right direction in FIG. 4) orthogonal to this direction.

In a case where the linearly polarized light reflection film 10B is disposed in the HUD system 20 shown in FIG. 1, the linearly polarized light reflection film 10B is disposed such that the axis P of the linearly polarized light reflection film 10B shown in FIG. 4 coincides with the vertical direction Y of the windshield glass 24.

It is known that a film in which a layer having a low refractive index (layer of low refractive index) and a layer having a high refractive index (layer of high refractive index) are alternately laminated reflects light having a specific wavelength due to constructive interference between a plurality of the layers of low refractive index and the layers of high refractive index. Therefore, the linearly polarized light reflection film 10B shown in FIGS. 3 and 4 reflects linearly polarized light in the vertical direction and transmits linearly polarized light in the horizontal direction in FIG. 4.

The dielectric multi-layer film used in HUD system according to the embodiment of the present invention includes three wavelengths of $\lambda_B$, $\lambda_G$, and $\lambda_R$ described above as selective reflection central wavelengths at a light incidence angle of 60°, and satisfies all of the regulations (a) to (c) described above between respective color laser beams in the laser light source.

In the dielectric multi-layer film, the selective reflection central wavelength and the reflectivity can be adjusted by a difference between a refractive index of the layer of low refractive index and a refractive index in the layer of high refractive index, a thickness, the number of lamination, and the like. In the example shown in FIG. 3, mainly, reflection having selective reflection central wavelength $\lambda_R$ at a light incidence angle of 60° is realized by the first laminated portion 13R, reflection having selective reflection central wavelength $\lambda_G$ at a light incidence angle of 60° is realized by the second laminated portion 13G, and reflection having selective reflection central wavelength $\lambda_B$ at a light incidence angle of 60° is realized by the third laminated portion 13B.

In the dielectric multi-layer film, the reflection peak having the selective reflection central wavelength obtained by the above-mentioned method is a peak having a maximum value having a difference of 2% or more from an adjacent minimum value and a half-width of 10 to 200 nm.

As described above, the selective reflection central wavelength and the reflectivity in the dielectric multi-layer film can be adjusted by a difference between a refractive index of the layer of low refractive index and a refractive index in the layer of high refractive index, a thickness, the number of layers, and the like. Specifically, a thickness d of the layer of low refractive index and the layer of high refractive index is set to $d=\lambda/(4\times n)$ based on the wavelength $\lambda$ of light to be reflected and the refractive index n. Accordingly, the selective reflection central wavelength can be adjusted. In addition, the reflectivity can be adjusted to adjust the number of layers because the reflectivity increases as the number of layers of the layers of low refractive index and the layers of high refractive index increases. In addition, the half-width of the reflection peak having this selective reflection central wavelength can be adjusted by the difference between a refractive index of the layer of low refractive index and a refractive index in the layer of high refractive index.

Here, the half-width of the reflection peak having each selective reflection central wavelength depends on a difference between a refractive index of the optically anisotropic layer in the slow axis direction and a refractive index of the optically isotropic layer, and the larger the difference between the refractive indices is, the greater the half-width is. In addition, in a case where a reflection peak having a low reflectivity is present at a near wavelength, interference occurs, and a phenomenon in which the reflection peak becomes too strong or too weak occurs. From the viewpoint of increasing the transmittance while improving the brightness of the display image by appropriately adjusting the half-width of the reflection peak having each selective reflection central wavelength, and from the viewpoint of reducing the influence of interference with an adjacent reflection peak, the difference between the refractive index in the slow axis direction of the optically anisotropic layer and the refractive index of the optically isotropic layer is preferably 0.03 to 0.20, more preferably 0.05 to 0.14, and still more preferably 0.05 to 0.10.

In addition, it is preferable that the dielectric multi-layer film includes a light reflection layer having $\lambda_B$ described above, a light reflection layer having $\lambda_G$ described above, and a light reflection layer having $\lambda_R$ described above as selective reflection central wavelengths at a light incidence angle of 60°, and these light reflection layers are in contact with each other. For example, in an example shown in FIG. 3, the first laminated portion 13R having a selective reflection central wavelength $\lambda_R$ at a light incidence angle of 60° and the second laminated portion 13G having a selective reflection central wavelength $\lambda_G$ at a light incidence angle of 60° are mutually contacted, and the second laminated portion 13G having a selective reflection central wavelength $\lambda_G$ at a light incidence angle of 60° and the second laminated portion 13B having a selective reflection central wavelength $\lambda_B$ at a light incidence angle of 60° are mutually contacted. The first laminated portion 13R, the second laminated portion 13G, and the third laminated portion 13B are light reflection layers constituting a dielectric multi-layer film (selective reflection layer) used in the HUD system according to the embodiment of the present invention.

Although not shown in FIG. 3, in addition to the three laminated portions (13R, 13G, and 13B), a selective reflection layer (hereinafter, referred to as a light reflection layer UV) having a selective reflection central wavelength of 300 nm or more and less than 400 nm at a light incidence angle of 60°, which is formed by laminating an optically anisotropic layer and an optically isotropic layer, is preferably included from the viewpoint of suppressing the reflection tint.

By providing the light reflection layer UV, in the case of a configuration of a windshield glass including a cholesteric liquid crystal layer and a retardation layer, which have been described above, it is possible to suppress a tint (particularly, a yellow tint) which is confirmed in a case where the windshield glass is observed under external light.

In a case where the light reflection layers having respective selective reflection central wavelength at a light incidence angle of 60° are spaced from each other, a film thickness between the layers is thick, and it is difficult to obtain the effect of interference of light reflected by each of the light reflection layers. On the other hand, by adopting a configuration in which the light reflection layers are in contact with each other, the half-width of the reflection peak having each selective reflection central wavelength can be narrowed because of the effect of interference of light reflected by each of the light reflection layers.

The linearly polarized light reflection film may have a thin film-shape, a sheet-shape, or the like. The linearly polarized light reflection film may have a roll-shape as a thin film before used for the windshield glass.

As a material and a method for producing the dielectric multi-layer film, for example, those described in JP1997-506837A (JP-H09-506837A) can be used. Specifically, in a case of performing a process under conditions selected in order to obtain the relationship between refractive indices, the dielectric multi-layer film can be formed by widely using various materials. Usually, a first material is required to have a refractive index different from a second material, in a selected direction. The difference in refractive indices can be achieved by various methods including stretching during film formation or after film formation, extrusion molding, and coating. Furthermore, two materials preferably have similar rheologic properties (for example, melt viscosity) so that the two materials can be coextruded.

Examples of the materials particularly preferably used in the dielectric multi-layer film include, as a material of the optically anisotropic layer, polyethylene naphthalate (PEN) and polyethylene terephthalate (PET), and include, as a material of the optically isotropic layer, PEN, PET, and a polymethyl methacrylate resin (PMMA) (which are isotropically adjusted).

As described above, the linearly polarized light reflection film (dielectric multi-layer film) used in the HUD system according to the embodiment of the present invention preferably has three laminated portions in which the optically anisotropic layer and the optically isotropic layer have different thicknesses in order to have the above-described three wavelengths of $\lambda_B$, $\lambda_G$, and $\lambda_R$ as selective reflection central wavelengths at a light incidence angle of 60°. In the present invention, each of the three laminated portions may be formed by the above described stretching, extrusion molding, and the like, and the laminated portions may be then bonded to each other to produce a linearly polarized light reflection film (dielectric multi-layer film). Alternatively, the thickness may be adjusted before the process so that the three laminated portions having different thicknesses are formed, thereby integrally forming the three laminated portions by stretching, extrusion molding, and the like.

The thickness of the dielectric multi-layer film is preferably 2.0 to 50 μm and more preferably 8.0 to 30 μm.

The linearly polarized light reflection film including a dielectric multi-layer film has a selective reflection layer (dielectric multi-layer film) formed by laminating an optically anisotropic layer and an optically isotropic layer. The linearly polarized light reflection film may be configured to include a retardation layer, a polarization conversion layer, a support, an adhesive layer, and the like in addition to the dielectric multi-layer film.

As the retardation layer, the polarization conversion layer, the support (transparent substrate), and the adhesive layer, which are used in the linearly polarized light reflection film, the description of the retardation layer, the polarization conversion layer, the transparent substrate (support), and the adhesive layer which are used in the linearly polarized light reflection film including the cholesteric liquid crystal layer described above can be applied.

Hereinafter, among the constituent elements of the windshield glass, the glass plate (laminated glass), the interlayer, and the heat seal layer (adhesive layer) will be sequentially described as constituent elements other than the above-described reflection film.

[2] Laminated Glass

The windshield glass may have a laminated glass configuration. The windshield glass used in the HUD system according to the embodiment of the present invention is a laminated glass, and preferably includes the reflection film described above between a first glass plate and a second glass plate.

The windshield glass may have a configuration in which the reflection film is arranged between the first glass plate and the second glass plate. However, the windshield glass preferably has a configuration in which an interlayer film (interlayer film sheet) is provided on at least one of between the first glass plate and the reflection film, or between the reflection film and the second glass plate.

In the windshield glass, as an example, the second glass plate is arranged on a side (outside the vehicle) opposite to a side where a video displayed by the HUD system is seen, and the first glass plate is arranged on the side where the image is seen (inside the vehicle). In the windshield glass used in HUD system according to the embodiment of the present invention, the term “first” and “second” in the first glass plate and the second glass plate have no technical meanings, and are provided for convenience in order to distinguish two glass plates. Therefore, the second glass plate may be arranged inside the vehicle and the first glass plate may be arranged outside the vehicle.

As glass plates such as the first glass plate and the second glass plate, glass plates generally used in the windshield glass can be used. For example, a glass plate having a visible light transmittance of 80% or less such as 73% or 76%, such as green glass having high heat shielding properties, may be used. Even in a case where a glass plate having a low visible light transmittance is used as described above, a windshield glass having a visible light transmittance of 70% or more in a position of the reflection film can be produced by using the reflection film described above.

The thickness of the glass plate is not particularly limited, and may be approximately 0.5 to 5.0 mm and is preferably 1.0 to 3.0 mm and more preferably 2.0 to 2.3 mm. Materials and thicknesses of the first glass plate and the second glass plate may be the same as or different from each other.

The windshield glass including the laminated glass structure can be manufactured by a usual method of producing a laminated glass.

In general, the laminated glass can be produced by a method of interposing the interlayer film for a laminated glass between two glass plates, repeating a heating treatment and a pressurizing treatment (pressurization using rubber rollers, or the like) several times, and finally performing the heating treatment under a pressurizing condition by using an autoclave.

As an example, the windshield glass having the laminated glass configuration including the reflection film and the interlayer film may be produced by the above described method for producing a laminated glass after the reflection film is formed on a surface of the glass plate, or may be produced by the above described method for producing a laminated glass using the interlayer film for the laminated glass including the above described reflection film.

In a case where the reflection film is formed on a surface of a glass plate, the glass plate on which the reflection film is provided may be either the first glass plate or the second glass plate. In this case, the reflection film may be laminated and bonded to a glass plate with an adhesive (heat seal layer), for example.

[3] Interlayer Film

The interlayer film 36 prevents the glass from being broken and scattering in a vehicle in the event of an accident. With the interlayer film 36, in the example shown in FIG. 2, the linearly polarized light reflection film 10A and the second glass plate 28 are bonded, in the example shown in FIG. 1, the reflection film 10 is bonded to the second glass plate 28, and in the example shown in FIG. 3, the linearly polarized light reflection film 10B is bonded to the second glass plate 28 and the first glass plate 30.

As the interlayer film (interlayer film sheet), any interlayer film usually used as an interlayer film (interlayer) in the laminated glass can be used. For example, a resin film including a resin selected from polyvinylbutyral (PVB), an ethylene-vinyl acetate copolymer, and a chlorine-containing resin can be used. The resin is preferably a main component of the interlayer film. The main component refers to a component occupying 50% by mass or more of the interlayer film.

Among the resins, at least one of polyvinylbutyral or an ethylene-vinyl acetate copolymer are preferable, and polyvinylbutyral is more preferable. The resin is preferably a synthesis resin.

Polyvinylbutyral can be obtained by acetalizing polyvinyl alcohol with butyl aldehyde. A preferable lower limit of the degree of acetalizing of the polyvinylbutyral is 40%, a preferable upper limit thereof is 85%, a more preferable lower limit thereof is 60%, and a more preferable upper limit is 75%.

The polyvinyl alcohol is normally obtained by saponification of polyvinyl acetate, and polyvinyl alcohol having a degree of saponification of 80% to 99.8% by mol is generally used.

In addition, a preferable lower limit of the degree of polymerization of the polyvinyl alcohol is 200 and a preferable upper limit thereof is 3,000. In a case where the degree of polymerization of polyvinyl alcohol is 200 or more, the penetration resistance of the obtained laminated glass is unlikely to be lowered. In a case where the degree is 3,000 or less, the resin film has good moldability, and the rigidity of the resin film does not become too large. Thus, a good workability is achieved. A more preferable lower limit thereof is 500 and a more preferable upper limit is 2,000.

Further, a thickness of the interlayer film 36 is not limited, and the thickness depending on the forming materials or the like may be set in the same manner as the interlayer film of the normal windshield glass.

In FIG. 1, the heat seal layer 38 is provided between the reflection film 10 and the first glass plate 30 in the windshield glass 24, and the reflection film 10 and the second glass plate 28 are attached to each other via the interlayer film 36, but the configuration of the windshield glass 24 is not limited thereto. That is, the heat seal layer may be provided between the reflection film 10 and the second glass plate 28, and an interlayer film may be provided between the reflection film 10 and the first glass plate 30.

In addition, the windshield glass 24 may not be configured to include the interlayer film 36, and may be configured to use the heat seal layer 38 to attach the reflection film 10 to the second glass plate 28, and attach the reflection film 10 to the first glass plate 30.

(Interlayer Film Including Reflection Film)

The interlayer film for the laminated glass including the reflection films can be formed with the reflection films being laminated and bonded onto a surface of the above described interlayer film. Alternatively, the reflection film may be sandwiched between the two interlayer films described above. The two interlayer films may be the same as each other or different from each other, and the same interlayer films are preferable.

A normal laminating and bonding method can be used to bond the reflection film to the interlayer film, and a laminating process is preferably used. It is preferable that the laminating process is performed under heating and pressurizing conditions to some extent such that the laminate (reflection film) and the interlayer film are not peeled off from each other after processed.

In order to stably perform the laminating, a film surface temperature of a side on which the interlayer film is adhered is preferably 50° C. to 130° C. and more preferably 70° C. to 100° C.

The pressurization is preferably performed at the time of laminating. The pressurizing condition is not limited, but is preferably lower than 2.0 kg/cm$^2$ (less than 196 kPa), more preferably 0.5 to 1.8 kg/cm$^2$ (49 kPa to 176 kPa), and still more preferably 0.5 to 1.5 kg/cm$^2$ (49 kPa to 147 kPa).

In a case where the reflection film includes a support (transparent substrate), the support may be peeled off at the same time as laminating, immediately after laminating, or immediately before laminating. That is, the reflection film attached to the interlayer film obtained after laminating may not have the support.

An example of a method of producing an interlayer film including the reflection film includes (1) a first step of laminating and bonding the reflection film to a surface of a first interlayer film to obtain a first laminate, and (2) a second step of laminating and bonding a second interlayer film on a surface opposite to the surface to which the first interlayer film of the reflection film in the first laminate is laminated and bonded.

For example, in the first step, the reflection film and the first interlayer film are laminated and bonded to each other so that the support and the first interlayer film do not face each other. Next, the support is peeled off from the reflection film. Furthermore, in the second step, the second interlayer film is laminated on the surface from which the support has been peeled off. As a result, it possible to produce the interlayer film including the reflection film having no support. In addition, the interlayer film including this reflection film can be used to produce the laminated glass in which the reflection film does not have the support.

In order to stably peel the support without breakage or other damage, the temperature of the support in a case where the support is peeled off from the reflection film is preferably 40° C. or higher, and more preferably 40° C. to 60° C.

[4] Heat Seal Layer (Adhesive Layer)

The heat seal layer (adhesive layer) 38 is, for example, a layer consisting of a coating-type adhesive. In the example shown in FIG. 2, the linearly polarized light reflection film 10A is attached to the first glass plate 30 via the heat seal layer 38. In the windshield glass used in the present invention, the linearly polarized light reflection film 10A may be attached to the first glass plate 30 via the interlayer film instead of the heat seal layer 38. In addition, in a case where the linearly polarized light reflection film 10A is smaller than the interlayer film 36 via which the second glass plate 28 and the linearly polarized light reflection film 10A are attached, the interlayer film 36 may be used to attach the linearly polarized light reflection film 10A to the first glass plate 30.

The heat seal layer 38 is not limited as long as the heat seal layer 38 can secure the transparency required for the windshield glass 24 and can attach the reflection film 10 to the glass with the necessary adhesive force, and various normal coating-type adhesives are available. The heat seal layer 38 may be the same as the interlayer film 36 such as PVB. In addition to this, as described later, adhesives such as an acrylate-based adhesive can also be used for the heat seal layer 38.

The heat seal layer 38 may be formed of an adhesive.

From the viewpoint of the curing-type, adhesives are classified into hot-melt adhesives, thermosetting adhesives, photocuring adhesives, reaction curing adhesives, and pressure-sensitive adhesives requiring no curing. In addition, as the adhesive, any type of compounds each selected from acrylate-based, urethane-based, urethane acrylate-based, epoxy-based, epoxy acrylate-based, polyolefin-based, modified olefin-based, polypropylene-based, ethylene vinyl alcohol-based, vinyl chloride-based, chloroprene rubber-based, cyanoacrylate-based, polyamide-based, polyimide-based, polystyrene-based, polyvinylbutyral-based, and the like as a material, can be used.

From viewpoints of workability and productivity, a photocuring method is preferable as a curing method, and from viewpoints of optical transparency and heat resistance, a compound selected from the acrylate-based, urethane acrylate-based, epoxy acrylate-based, and the like as a material, are preferably used.

The heat seal layer 38 may be formed by using a highly transparent adhesive transfer tape (OCA tape). A commercially available product for an image display device, in particular, a commercially available product for a surface of an image display portion of an image display device may be used as the highly transparent adhesive transfer tape. Examples of commercially available products include pressure sensitive adhesive sheets (trade name: PD-S1and the like) manufactured by Panac Co., Ltd., and pressure sensitive adhesive sheets of MHM (trade name) series manufactured by Nichiei Kako Co., Ltd.

The thickness of the heat seal layer 38 is also not limited. Therefore, depending on the material for forming the heat seal layer 38, the thickness at which sufficient adhesive force can be obtained may be appropriately set.

Here, in a case where the heat seal layer 38 is excessively thick, the reflection film 10 may not be attached to the second glass plate 28 or the first glass plate 30 while the planarity is sufficiently maintained. In consideration of this point, the thickness of the heat seal layer 38 is preferably 0.1 to 800 μm, and more preferably 0.5 to 400 μm.

<Projector>

The "projector" is a "device projecting light or a screen image", includes a "device projecting a drawn screen image", and emits projection light carrying and supporting a screen image to be displayed. In the HUD system according to the embodiment of the present invention, the projector is not particularly limited as long as the projector includes a laser light source that emits laser beam of three colors of blue light, green light, and red light and satisfies all of the above-described regulations (a) to (c) between the projector and the above-described selective reflection layer, but it is preferable that the projector emits p-polarized projection light.

In the HUD system, the projector may be arranged so that the projection light (preferably, p-polarized projection light) carrying and supporting a screen image to be displayed can be incident into the reflection film in the windshield glass at an obliquely incidence angle.

In the HUD system, the projector includes a drawing device, and preferably displays, as a virtual image by reflection, a screen image (real image) drawn on a small intermediate image screen using a combiner.

A normal projector used for the HUD system can be used as long as the projector can emit p-polarized projection light. In addition, in the projector, an imaging distance of the virtual image, that is, a virtual image formation position is preferably variable.

Examples of a method of changing an imaging distance of a virtual image in the projector include a method in which a surface (screen) on which a screen image is generated is moved (see JP2017-21302A), a method in which a plurality of optical paths having different optical path lengths are changed (see WO2015/190157A), a method in which the optical path length is changed by inserting and/or moving mirrors, a method in which the focal length is changed by using an assembled lens as an imaging lens, a method in which the projector 22 is moved, a method in which a plurality of projectors having different imaging distances of virtual images are changed and used, and a method in which a variable-focal-length lens is used (see WO2010/116912A).

The projector may be a projector in which the imaging distance of a virtual image is continuously changeable or a projector in which the imaging distance of a virtual image can be changed at two or three or more points.

Herein, the imaging distances of at least two virtual images among virtual images of projection light from the projector are preferably different from each other by 1 m or more. Therefore, in a case where the imaging distance of a virtual image can be continuously changed by the projector, the imaging distance of a virtual image is preferably changeable by 1 m or more. Such a projector is preferably used because the projector can suitably handle the case where the distance of visual line of the driver is considerably different between a normal speed run on the general road and a high speed run on the expressway.

(Drawing Device)

The drawing device may itself be a device displaying a screen image or a device emitting light capable of drawing a screen image.

In the drawing device, light from the light source may be adjusted by a drawing method such as an optical modulator, laser brightness modulation unit, optical deflection unit for drawing, or the like. The drawing device includes a light source, and means a device including an optical modulator, laser brightness modulation unit, optical deflection unit for drawing, or the like according to the drawing method.

(Light Source)

The light source used in the HUD system according to the embodiment of the present invention is a laser light source emitting laser beams of three colors of blue light, green light, and red light, and is not particularly limited as long as all of the above-mentioned regulations (a) to (c) can be satisfied with the above-mentioned selective reflection layer. A normal laser light source used in a projector, a drawing device, a display, and the like can be used, and a semiconductor laser is preferably used.

For example, in a case where a semiconductor laser is used as the laser light source, generally, a peak emission wavelength of blue laser beam is 450±10 nm, a peak emission wavelength of green laser beam is 518±7 nm, and a peak emission wavelength of red laser beam is 638±5 nm.

The absolute value of the difference between the peak emission wavelength of the blue laser beam and the selective reflection central wavelength $\lambda_B$ in the above-described selective reflection layer is usually 10 nm or less and preferably 5 nm or less.

Similarly, the absolute value of the difference between the peak emission wavelength of the green laser beam and the selective reflection central wavelength $\lambda_G$ in the above-described selective reflection layer is usually 7 nm or less and preferably 4 nm or less, and the absolute value of the difference between the peak emission wavelength of the red laser beam and the selective reflection central wavelength $\lambda_R$ in the above-described selective reflection layer is usually 5 nm or less and preferably 3 nm or less.

(Drawing Method)

The drawing method can be selected in accordance with the laser light source that emits laser beams of the three colors of blue light, green light, and red light, and examples thereof include a scanning method using a laser, and the like.

The scanning method is a method of scanning a screen with light rays and imaging using an afterimage in eyes. For example, the description ofJP1995-270711A (JP-H7-270711A) and JP2013-228674A can also be referred to. In the scanning method using the laser, a luminance modulated laser beam having each color of, for example, red light, green light, and blue light may be bundled into one ray of light by a multiplexing optical system or a condenser lens, the scanning may be performed with the ray of light by the optical deflection unit, and the ray of light may be drawn on an intermediate image screen to be described later.

In the scanning method, the luminance modulation of a laser beam having each color of, for example, red light, green light, and blue light may be performed directly by changing an intensity of the light source, or may be performed by an external modulator. Examples of the optical deflection unit include a galvanometer mirror, a combination of a galvanometer mirror and a polygon mirror, and a micro electro mechanical systems (MEMS), and among these, MEMS is preferable. The scanning method includes a random scan method, a raster scan method, or the like, and a raster scan method is preferably used. In the raster scan method, the laser beam can be driven, for example, with a resonance frequency in a horizontal direction and with a saw-tooth wave in a vertical direction. Since the scanning method does not require the projection lens, it is easy to miniaturize the device.

Among these, a raster scan method is generally used in which a two axis MEMS mirror is irradiated with RGB light from a light source module having laser light sources of blue light, green light, and red light, the MEMS mirror is driven at a high speed to draw an image on an intermediate image screen by RGB reflected light.

Light emitted from the drawing device may be linearly polarized light or natural light (non-polarized light).

In a drawing device using a laser light source, the emitted light is essentially linearly polarized light. In the case where a drawing device in which the emitted light is linearly polarized light and includes light beams having a plurality of wavelengths (colors), the polarization directions (transmission axis directions) of light in a plurality of wavelengths are preferably the same as each other. Known commercially available drawing devices include a device that has non-uniform polarization directions in wavelength ranges of red light, green light, and blue light included in the emitted light (see JP2000-221449A). Specifically, an example is known that the polarization direction of the green light is orthogonal to the polarization direction of the red light and the polarization direction of the blue light.

As described above, in the HUD system according to the embodiment of the present invention, the projection light emitted by the projector is preferably p-polarized light.

(Intermediate Image Screen)

As described above, the drawing device may use an intermediate image screen. The "intermediate image screen" is a screen on which a screen image is drawn. That is, in a case where light emitted from the drawing device is not yet visible as a screen image, the drawing device forms a screen image visible on the intermediate image screen using the light. The screen image drawn on the intermediate image screen may be projected on the combiner by light transmitted through the intermediate image screen, and may be reflected on the intermediate image screen and projected on the combiner.

Examples of the intermediate image screen include a scattering film, a microlens array, a screen for rear projection, and the like. In a case where a plastic material is used as the intermediate image screen, assuming that the intermediate image screen has birefringence, a polarization plane and a light intensity of the polarized light incident on the intermediate image screen are in disorder, and color unevenness or the like is likely to occur in the combiner (reflection film). However, by using a phase difference film having a predetermined phase difference, the problem of occurrence of color unevenness can be reduced.

It is preferable that the intermediate image screen has a function of spreading and transmitting incident rays. This is because an enlarged projection image can be displayed. An example of the intermediate image screen includes a screen composed of a microlens array. The microlens array used in the HUD system is described in, for example, JP2012-226303A, JP2010-145745A, and JP2007-523369A. The projector may include a reflecting mirror which adjusts an optical path of projection light formed by the drawing device.

Regarding HUD systems using the windshield glass as the reflection film, JP1990-141720A (JP-H02-141720A), JP1998-096874A (JP-H10-096874A), JP2003-98470A, U.S. Pat. No. 5,013,134A, and JP2006-512622A can be referred to.

[Projection Light (Incident Light)]

The incident light is preferably incident at an obliquely incidence angle of 45° to 70° with respect to the normal line of the reflection film. The Brewster's angle at an interface between the glass having a refractive index of approximately 1.51 and the air having a refractive index of 1 is approximately 56°, and the p-polarized light is allowed to incident in the range of the angle; thereby, an image display with the small amount of the reflected light of the incident light for the projection image display, which is reflected from the surface of the windshield glass on the visible side with respect to the selective reflection layer, and a decreased effect of a double image can be achieved.

The above described angle is also preferably set to 50° to 65°. At this time, it is preferable to employ a configuration in which an observation of the projection image can be performed at an angle of 45° to 70°, preferably 50° to 65° on a side opposite to a side on which light is incident, with respect to the normal line of the selective reflection layer in the side on which projection light is incident.

The incident light may be incident from any direction of upwards, downwards, rightwards, and leftwards of the windshield glass, and may be determined in accordance with a visible direction. For example, the incident light is preferably incident at an obliquely incidence angle from the bottom during the use.

In addition, the reflection film of the windshield glass is preferably disposed to reflect the incident p-polarized light.

As described above, the projection light in a case of displaying the projection image in the HUD system according to the embodiment of the present invention is preferably p-polarized light vibrating in the direction parallel to the incident surface.

In a case where the light emitted from the projector is not linearly polarized light, the light may be converted into p-polarized light by providing a linearly polarized light film (polarizer) on the light emitting side of the projector, or the light may be converted into p-polarized light by a usual method of using the linearly polarized light film or the like on an optical path between the projector and the windshield glass. In this case, it is considered that a member converting projection light that is not linearly polarized light into p-polarized light is also included in the projector of the HUD system according to the embodiment of the present invention.

As described above, in the projector whose polarization direction is not uniform in the wavelength ranges of red light, green light, and blue light of the emitted light, the polarization direction is preferably adjusted in a wavelength selective manner, and light is incident in all color wavelength ranges as p-polarized light.

As described above, the HUD system (projector) may be a projection system in which a virtual image formation position is variable. The variable virtual image formation position enables the driver to visually confirm the virtual image more comfortably and conveniently.

The virtual image formation position is a position at which the driver of the vehicle can visually confirm a virtual image, and for example, typically, a position positioned 1000 mm or more away from the front of the windshield glass as seen by a driver.

In FIG. 1, a vertical direction Y of the windshield glass 24 is a direction corresponding to the vertical direction of a vehicle or the like in which the windshield glass 24 is placed, and the direction is defined such that the ground side is a lower side and a side opposite to the lower side is an upper side. In the case where the windshield glass 24 is placed in the vehicle or the like, the windshield glass 24 may be arranged in an inclined manner for the sake of convenience of structure or design, and in this case, the vertical direction Y corresponds to a direction along a surface of the windshield glass 24. The surface is the outer surface side of the vehicle.

The present invention is basically configured as described above. Although the HUD system according to the embodiment of the present invention, the windshield glass which is the constituent elements thereof, and the like have been described in detail above, the present invention is not limited to the above described embodiment, and various improvements and modifications may be made without departing from the gist of the present invention. Examples Hereinafter, the present invention will be described in more detail based on Examples. The materials, amounts used, ratios, treatment details, treatment procedures, and the like shown in the Examples below can be changed as appropriate without departing from the gist of the present invention. Accordingly, the scope of the present invention is not limited to the following specific examples.

"Part" and "%" that represent compositions in the following Examples are based on the mass unless particularly otherwise described. In addition, the room temperature means "25° C.".

<Preparation of Coating Liquid>

(1) Cholesteric Liquid Crystal Layer-Forming Coating Liquid

The following components were mixed to have the compositional ratio shown below, thereby preparing each narrow-band cholesteric liquid crystal layer-forming coating liquid for forming cholesteric liquid crystal layers (UV1, B1, G1, R1) each of which has a selective reflection central wavelength as a desired wavelength shown in Table 1 below.

| Narrow-band cholesteric liquid crystal layer-forming coating liquid | |
| --- | --- |
| Rod-shaped liquid crystal compound 101 | 55 parts by mass |
| Rod-shaped liquid crystal compound 102 | 30 parts by mass |
| Rod-shaped liquid crystal compound 201 | 13 parts by mass |
| Rod-shaped liquid crystal compound 202 | 2 parts by mass |
| Polymerization initiator IRGACURE OXE01 (trade name, manufactured by BASF SE) | 1.0 part by mass |
| Alignment control agent 1 (fluorine-based horizontal alignment agent 1) | 0.01 parts by mass |
| Alignment control agent 3 (fluorine-based horizontal alignment agent 3) | 0.01 parts by mass |
| Dextrorotatory chiral agent Paliocolor LC756 (trade name, manufactured by BASF SE) | adjusted in accordance with the target selective reflection central wavelength |
| Solvent (methyl ethyl ketone) | the amount of a solute concentration of 20% by mass |

Rod-shaped liquid crystal compound 101:

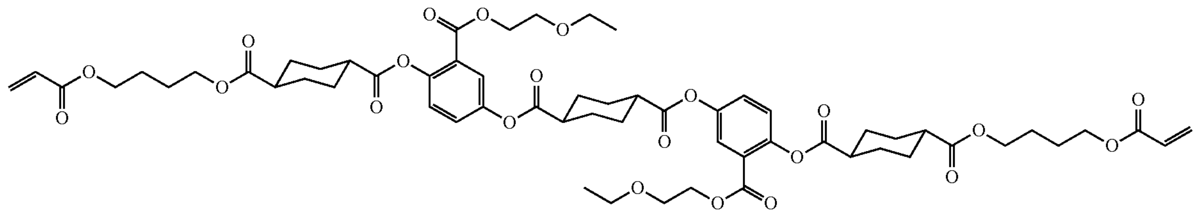 [SMILES: C=CC(=O)OCCCCOC(=O)C1CCC(C(=O)Oc2ccc(OC(=O)C3CCC(C(=O)Oc4ccc(OC(=O)C5CCC(C(=O)OCCCCOC(=O)C=C)CC5)c(C(=O)OCCOCC)c4)CC3)cc2C(=O)OCCOCC)CC1]

Rod-shaped liquid crystal compound 102:
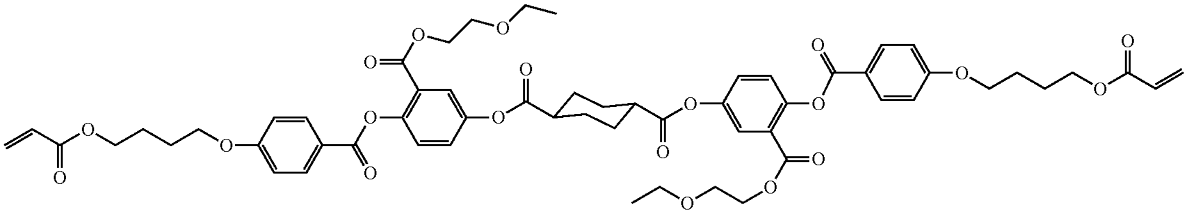 [SMILES: C=CC(=O)OCCCCOc1ccc(C(=O)Oc2ccc(OC(=O)C3CCC(C(=O)Oc4ccc(OC(=O)c5ccc(OCCCCOC(=O)C=C)cc5)c(C(=O)OCCOCC)c4)CC3)cc2C(=O)OCCOCC)cc1]
Rod-shaped liquid crystal compounds 201 and 202:
Rod-like liquid crystal compound 201
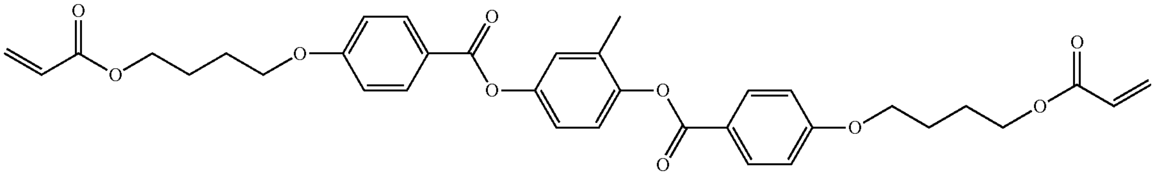 [SMILES: C=CC(=O)OCCCCOc1ccc(C(=O)Oc2ccc(OC(=O)c3ccc(OCCCCOC(=O)C=C)cc3)c(C)c2)cc1]
Rod-like liquid crystal compound 202
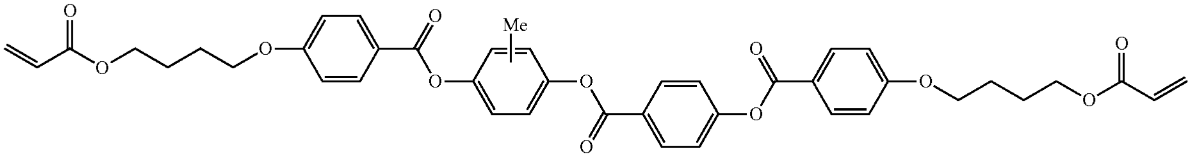
Alignment control agent 1:
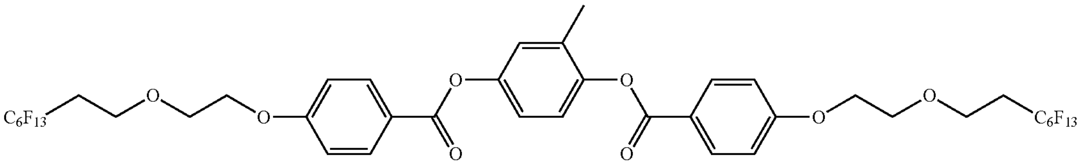
Alignment control agent 3:
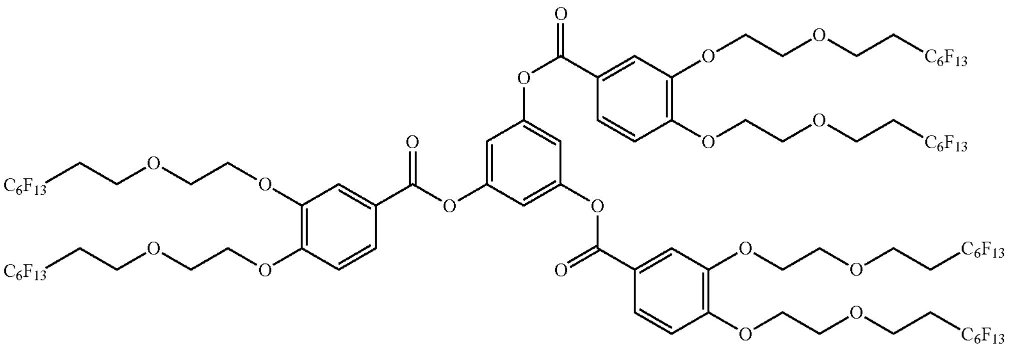

(Reflection Properties of Cholesteric Liquid Crystal Layer)

Each cholesteric liquid crystal layer (layer cured by a polymerization reaction) of a single layer having a film thickness of about 3 μm was produced on a temporary support in the same manner as in the production of the cholesteric liquid crystal layer which will be described below, using each cholesteric liquid crystal layer-forming coating liquid prepared above. It was confirmed that all of the produced cholesteric liquid crystal layers were dextrorotatory circularly polarized light reflection layers, and the selective reflection central wavelength (central wavelengths) and the half-width of the reflection peak were a wavelength shown in Table 1.

The selective reflection central wavelength and the half-width of the reflection peak shown in Table 1 are values measured by [Evaluation α] Measurement of reflection spectrum of selective reflection layer described later.

TABLE 1

| Cholesteric liquid crystal layer | UV1 | B1 | G1 | R1 |
|---|---|---|---|---|
| Selective reflection central wavelength (60°) | 380 nm | 450 nm | 520 nm | 640 nm |
| Selective reflection central wavelength (5°) | 450 nm | 550 nm | 655 nm | 740 nm |
| Half-width of reflection peak (60°) | 30 nm | 35 nm | 45 nm | 48 nm |

(2) Retardation Layer-Forming Coating Liquid

The following components were mixed to have the following compositional ratio, thereby preparing a retardation layer-forming coating liquid.

| | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.01 parts by mass |
| Polymerization initiator IRGA-CURE OXE01 (trade name, manufactured by BASF SE) | 1.0 part by mass |
| Solvent (methyl ethyl ketone) | the amount of a solute concentrationo f 20% by mass |

(3) Polarization Conversion Layer-Forming Coating Liquid

The following components were mixed to have the following compositional ratio, thereby preparing a polarization conversion layer-forming coating liquid.

| | |
|---|---|
| Mixture 1 | 100 parts by mass |
| Fluorine-based horizontal alignment agent 1 (alignment control agent 1) | 0.05 parts by mass |
| Fluorine-based horizontal alignment agent 2 (alignment control agent 2) | 0.02 parts by mass |
| Polymerization initiator IRGA-CURE OXE01 (trade name, manufactured by BASF SE) | 0.26 parts by mass |
| Solvent (methyl ethyl ketone) | the amount of a solute concentration of 20% by mass |

Mixture 1:

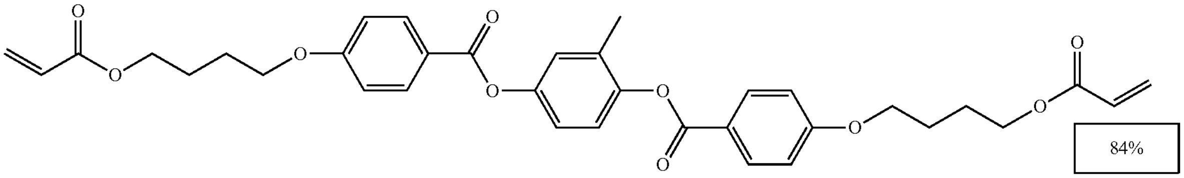

84%

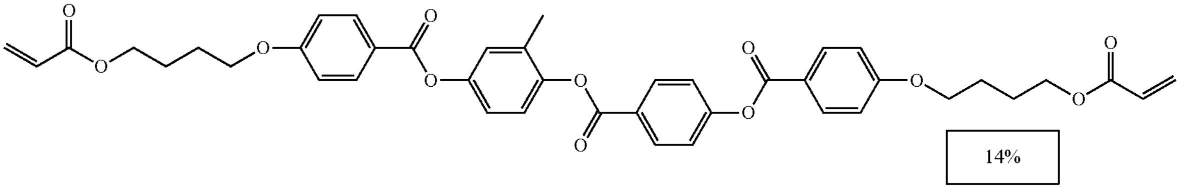

14%

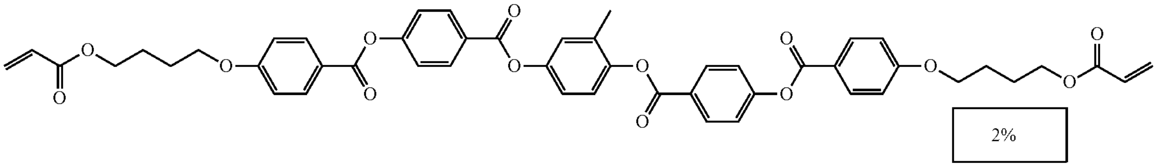

2%

The numerical values are in terms of % by mass.

Alignment control agent 2:

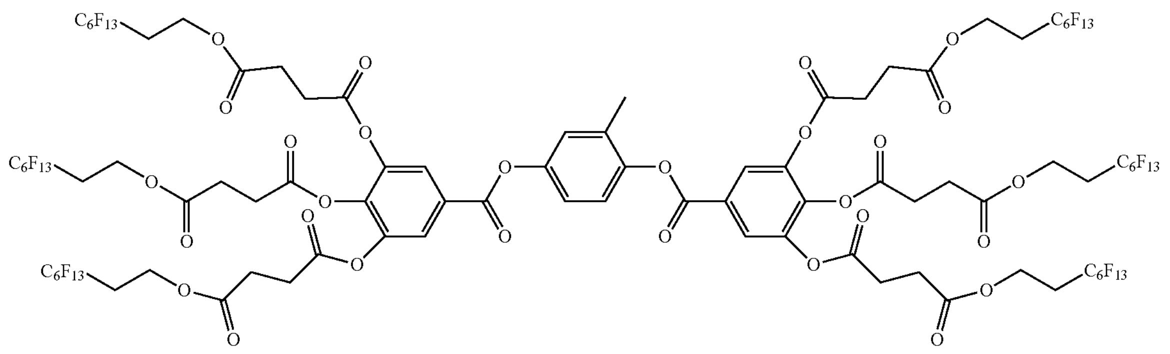

(Polarization Properties of Polarization Conversion Layer)

The polarization conversion layer obtained from polarization conversion layer-forming coating liquid prepared as described above had a selective reflection central wavelength λ of 10,000 nm at a light incidence angle of 5°.

The selective reflection central wavelength λ at a light incidence angle of 5° was measured with fourier transform infrared spectroscopy (FTIR, manufactured by PerkinElmer, Inc., trade name: Spectrum Two) by producing a single cholesteric liquid crystal layer having a film thickness of about 3 μm on a temporary support using the polarization conversion layer-forming coating liquid prepared as described above.

In addition, in the cholesteric liquid crystal layer, the film thickness d of the helical structure is represented by "the pitch P×the number of pitches of the helical structure". As described above, the pitch P of the helical structure means the thickness of the layer in a case where the helically aligned liquid crystal compound rotates by 360°. In addition, in the cholesteric liquid crystal layer, the selective reflection central wavelength λ at a light incidence angle of 5° coincides with "the pitch P of the helical structure×the average refractive index n in the plane" (λ=P×n). Therefore, the pitch P of the helical structure is "the selective reflection central wavelength λ at a light incidence angle of 5°/the average refractive index n in the plane" (P=λ/n).

EXAMPLE 1

Production of Windshield Glass

<1-1> Production of Selective Reflection Layer Consisting of Cholesteric Liquid Crystal Layer (1) Production of Saponified Cellulose Acylate Film A cellulose acylate film having a thickness of 40 μm was produced in the same manner as described in the production of the cellulose acylate film described in Example 20 of WO2014/112575, except that a core layer cellulose acylate dope obtained by blending 3 parts by mass of an ultraviolet absorber UV-531 (trade name) manufactured by Fujian Disheng Technology Co., Ltd. with 100 parts by mass of cellulose acetate (not including the ester oligomer A) was used as the core layer cellulose acylate dope instead of 2 parts by mass of the ultraviolet absorber described in paragraph [0277] of WO2014/112575A.

The produced cellulose acylate film passed through a dielectric heating roll having a temperature of 60° C., and a temperature at the film surface was increased to 40° C. Thereafter, one side of the film was coated with an alkaline solution in the composition provided as below to have a coating amount of 14 mL/m$^2$ by using a bar coater and was allowed to stay under a steam-type far infrared heater (manufactured by Noritake Co., Ltd.) heated to 110° C. for 10 seconds.

Next, pure water was applied at 3 mL/m$^2$ by using a bar coater in the same manner.

Next, washing with water using a fountain coater and dewatering using an air knife were repeated three times, staying in a drying zone at 70° C. was performed for 5 seconds, and drying was performed to produce a cellulose acylate film (transparent support) subjected to the saponification treatment.

The in-plane phase difference of the saponified cellulose acylate film was measured by AxoScan (manufactured by Axometrics, Inc., trade name), and the measurement result was 1 nm.

| Composition of alkaline solutions | |
|---|---|
| Potassium hydroxide | 4.7 parts by mass |
| Water | 15.7 parts by mass |
| Isopropanol | 64.8 parts by mass |
| Surfactant ($C_{16}H_{33}O(CH_2CH_2O)_{10}H$) | 1.0 part by mass |
| Propylene glycol | 14.9 parts by mass |

(2) Formation of Alignment Film

The saponified surface of the saponified cellulose acylate film (transparent support) is coated with an alignment film-forming coating liquid having a composition illustrated below by a wire bar coater at 24 mL/m$^2$, and dried with hot air at 100° C. for 120 seconds to for an alignment film.

| Composition of alignment film-forming coating liquid | |
|---|---|
| Modified polyvinyl alcohol shown below | 28 parts by mass |
| Citric acid ester (trade name: AS3, manufactured by Sankyo Chemical Co., Ltd.) | 1.2 parts by mass |
| Photoinitiator (trade name: IRGACURE 2959, manufactured by BASF) | 0.84 parts by mass |
| Glutaraldehyde | 2.8 parts by mass |
| Water | 699 parts by mass |
| Methanol | 226 parts by mass |

Modified polyvinyl alcohol:

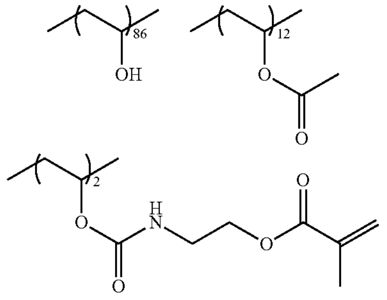

(3) Production of Laminate of Retardation Layer, Selective Reflection Layer, and Polarization Conversion Layer (3-1) Production of Retardation Layer The cellulose acylate film on which the alignment film was formed was used as a support (transparent substrate).

A surface of the alignment film in support was subjected to a rubbing treatment in a direction rotated clockwise by 45° with respect to the long side direction of the support. Specifically, the treatment was performed using rayon cloth under the conditions of pressing force: 0.1 kgf (0.98 N), rotation speed: 1,000 revolutions per minute (rpm), transport speed: 10 m/min, and the number of times: 1 round trip.

The retardation layer-forming coating liquid prepared as described above was applied to the rubbed surface of the alignment film on the support by a wire bar, and then dried.

Next, the coated result was placed on a hot plate at 50° C. and irradiated with ultraviolet light for 6 seconds by an electrodeless lamp "D bulb" (60 $mW/cm^2$) manufactured by Fusion UV Systems Inc. in an environment with an oxygen concentration of 1,000 ppm or less, and the liquid crystalline phase was immobilized. As a result, a retardation layer having a desired front phase difference, that is, a thickness adjusted to obtain a desired retardation was obtained.

The retardation of the produced retardation layer was measured with AxoScan (manufactured by Axometrics, Inc., trade name) and found to be 126 nm.

(3-2) Production of Selective Reflection Layer

The cholesteric liquid crystal layer (UV1)-forming coating liquid is applied to the surface of the obtained retardation layer at room temperature using a wire bar such that the film thickness after drying was the film thickness described in Table 3 below, and a coating layer was obtained.

The coating layer was dried at room temperature for 30 seconds and heated in an atmosphere of 85° C. for 2 minutes. Thereafter, in an environment with an oxygen concentration of 1,000 ppm or less, a D bulb (60 $mW/cm^2$ lamp) manufactured by Fusion Co., Ltd. was used for irradiation with ultraviolet light at 60° C. and 60% output for 6 to 12 seconds to immobilize a cholesteric liquid crystalline phase, thereby obtaining a cholesteric liquid crystal layer UV1 having the film thickness shown in Table 3 below.

Next, the cholesteric liquid crystal layer B1, the cholesteric liquid crystal layer G1, and the cholesteric liquid crystal layer R1 were laminated in this order on the surfaces of the obtained cholesteric liquid crystal layer UV1 to have the film thicknesses shown in Table 3 below, and thereby obtaining a laminate in which four cholesteric liquid crystal layers were laminated on the retardation layer.

Each of the cholesteric liquid crystal layers B1, G1, and R1 was produced layer by layer in the same manner as in the production of the cholesteric liquid crystal layer UV1, except that the corresponding cholesteric liquid crystal layer (B1, G1, and R1)-forming coating liquid was used instead of the cholesteric liquid crystal layer (UV1)-forming coating liquid.

The selective reflection layer of No. 106 was produced in the same manner except that the cholesteric liquid crystal layer UV1 was not provided and the cholesteric liquid crystal layer B1 was laminated on the retardation layer.

(3-3) Production of Polarization Conversion Layer

Next, the polarization conversion layer-forming coating liquid prepared as described above is applied on the outermost surface of the obtained cholesteric liquid crystal layer in the obtained laminate to have a film thickness of 1.7 μm, thereby forming a polarization conversion layer (twisted layer). The polarization conversion layer was produced in the same manner as in the production of the cholesteric liquid crystal layer described above, except that the polarization conversion layer-forming coating liquid was used instead of the cholesteric liquid crystal layer-forming coating liquid.

The obtained polarization conversion layer was a twisted layer having a selective reflection central wavelength λ of 10,000 nm and the number of pitches of 0.265.

In this manner, a laminate (this laminate is also referred to as a "reflection film") obtained by laminating the retardation layer, the selective reflection layer, and the polarization conversion layer was laminated on the support (transparent substrate) in this order was produced.

<1-2> Production of Selective Reflection Layer (Dielectric Multi-Layer Film) Consisting of Linearly Polarized Light Reflection Film A selective reflection layer consisting of the linearly polarized light reflection film was produced as follows, based on a method described in JP1997-506837A (JP-H09-506837A).

Each of 2,6-Polyethylene naphthalate (PEN) and copolyester (coPEN) of 70 mol % of naphthalate and 30 mol % of terephthalate was synthesized in a standard polyester resin synthesis oven using ethylene glycol as a diol.

A monolayer film of obtained PEN and coPEN was extrusion-molded, stretched at about 150° C. and a stretching ratio of 5:1, and heat-treated at about 230° C. for 30 seconds. As a result of this stretching heat treatment, it was confirmed that a refractive index with respect to the slow axis (alignment axis) of the PEN film was about 1.86, a refractive index with respect to the transverse axis was 1.64, coPEN film was isotropic, and a refractive index of the coPEN film was about 1.64.

Next, by adjusting the stretching ratio, it was confirmed that a refractive index with respect to the slow axis of the PEN film was about 1.71, a refractive index with respect to the transverse axis was 1.64, coPEN film was isotropic, and a refractive index of the coPEN film was about 1.64. That is, the difference Δn between the refractive index in the slow axis direction of the PEN film as the optically anisotropic layer and the refractive index of the coPEN film as the optically isotropic layer was 0.07.

Subsequently, a laminate obtained by co-extruding PEN and coPEN was stretched and heat-treated to produce a linearly polarized light reflection film (also referred to as a "reflection film"). This linearly polarized light reflection film had a thickness of about 28 μm, and had a linearly polarized light reflection layer UV2 having 44 layers of PEN and 44 layers of coPEN alternately and having a film thickness shown in the column of UV2 of Table 2 below, a linearly polarized light reflection layer B2 having 44 layers of PEN and 44 layers of coPEN alternately and having a film thickness shown in the column of B2 of Table 2 below, a linearly polarized light reflection layer G2 having 39 layers of PEN and 39 layers of coPEN alternately and having a film thickness shown in the column of G2 of Table 2 below, and a linearly polarized light reflection layer R2 having 38 layers of PEN and 38 layers of coPEN alternately and having a film thickness shown in the column of R2 of Table 2 below in this order.

Specifically, each laminate before stretching corresponding to the UV2 layer, the B2 layer, the G2 layer, and the R2 layer in Table 2 below was produced using an 88-slot feed block equipped with a standard extrusion die under the same conditions as those described in Example 1 of JP1997-506837A (JP-H9-506837A), then the laminate obtained by laminating all of these is uniaxially stretched at about 150° C. and a stretching ratio of 5:1, and the stretched laminate is placed in an air oven and heat-treated at about 230° C. for 30 seconds, thereby producing a linearly polarized light reflection film.

For example, in the laminate before stretching corresponding to the UV2 layer in Table 2 below, under the condition of 295° C. such that the optical quarter-wavelength thickness at the reflection wavelengths 445 nm was obtained, PEN was extruded at about 7.9 lb/hr and coPEN was extruded at 7.6 lb/hr. The other laminates before stretching corresponding to the B2 layer, the G2 layer, and the R2 layer were also extrusion-molded based on the same concept.

The selective reflection central wavelength and the half-width of the reflection peak shown in Table 2 are values measured by [Evaluation α] Measurement of reflection spectrum of selective reflection layer described later.

TABLE 2

| Linearly polarized light reflection layer | UV2 | B2 | G2 | R2 |
|---|---|---|---|---|
| Selective reflection central wavelength (60°) | 380 nm | 450 nm | 520 nm | 640 nm |
| Selective reflection central wavelength (5°) | 445 nm | 526 nm | 608 nm | 748 nm |
| PEN film thickness | 65.1 nm | 76.9 nm | 88.9 nm | 109.4 nm |
| coPEN film thickness | 67.8 nm | 80.2 nm | 92.7 nm | 114.0 nm |
| Half-width of reflection peak (60°) | 30 nm | 25 nm | 45 nm | 48 nm |

<2-1> Production of Windshield Glass Having Selective Reflection Layer Consisting of Cholesteric Liquid Crystal Layer Using the laminate obtained by laminating the support (transparent substrate), the retardation layer, the selective reflection layer, and the polarization conversion layer in this order, a laminate in which the second glass plate, the interlayer film, the polarization conversion layer, the selective reflection layer (cholesteric liquid crystal layer), the retardation layer, the support (transparent substrate), the heat seal layer, and the first glass plate were laminated in this order was produced.

In the heat seal layer in the laminate, a heat seal layer-forming coating liquid was applied to the support (transparent substrate) side of the selective reflection layer consisting of a cholesteric liquid crystal layer using a wire bar, dried, and heated at 50° C. for 1 minute to form a heat seal layer having a thickness of 1 μm.

The obtained laminate was held at 90° C., 10 kPa (0.1 atm) for 1 hour, and then heated in an autoclave (manufactured by Kurihara Seisakusho Co., Ltd.) at 115° C., 1.3 MPa (13 atm) for 20 minutes to remove air bubbles, thereby obtaining a windshield glasses Nos. 101 to 104, 106, and c11.

<2-2> Production of Windshield Glass Having Selective Reflection Layer Consisting of Linearly Polarized Light Reflection Film Using the linearly polarized light reflection film produced as described above, a laminate was produced by laminating the second glass plate, the interlayer film, the selective reflection layer (dielectric multi-layer film), the interlayer film, and the first glass plate in this order. The obtained laminate was held at 90° C., 10 kPa (0.1 atm) for 1 hour, and then heated in an autoclave (manufactured by Kurihara Seisakusho Co., Ltd.) at 115° C., 1.3 MPa (13 atm) for 20 minutes to remove air bubbles, thereby obtaining a windshield glass No. 105.

In the linearly polarized light reflection film, lamination was performed such that the linearly polarized light reflection layer UV2 was on the first glass plate side and the linearly polarized light reflection layer R2 was on the second glass plate side.

The windshield glass was used by cutting each layer into the same shape as the first glass plate and the second glass plate.

The glass plate, the interlayer film, and the heat seal layer-forming coating liquid, which are used for producing the windshield glass are as follows.

As the first glass plate and the second glass plate, a glass plate (manufactured by Central Glass Co., Ltd., FL2, visible light transmittance of 90%) having a length of 120 mm×a width of 100 mm, and a thickness of 2 mm was used.

In addition, a polyvinylbutyral (PVB) film having a thickness of 0.38 mm manufactured by Sekisui Chemical Co., Ltd. was used as an interlayer film.

In addition, in the production of the heat seal layer, the heat seal layer-forming coating liquid prepared by mixing the following components to have the following compositional ratio, was used.

(Heat Seal Layer-Forming Coating Liquid)

| | |
|---|---|
| PVB sheet piece (manufactured by Sekisui Chemical Co., Ltd., ESLEK film) | 5.0 parts by mass |
| Methanol | 90.25 parts by mass |
| Butanol | 4.75 parts by mass |

The following Table 3 collectively shows the configuration of the selective reflection layer in each windshield glass.

The selective reflection layer of No. c11 was produced in the same manner as in the production of the selective reflection layer of No. 103 except that each of the coating liquids (UV, B, G, and R) for the reflection layer described in Table 2 of JP2018-81296A was used instead of each of the cholesteric liquid crystal layer (UV1, B1, G1, and R1)-forming coating liquids.

The optical properties of each of the cholesteric liquid crystal layers (UV3, B3, G3, and R3) in No. c11 are the same as the optical properties of each of the reflection layers (UV, B, G, and R) described in Table 3 of JP2018-81296A, respectively.

In addition, in [Evaluation α] Measurement of reflection spectrum of selective reflection layer described later, the half-width of the reflection peak having each of the respective selective reflection central wavelengths in the selective reflection layer of No. c11 measured by setting the light incidence angle to 60° were 30 nm for the cholesteric liquid crystal layer UV3, 35 nm for the cholesteric liquid crystal layer B3, 45 nm for the cholesteric liquid crystal layer G3, and 47 nm for the cholesteric liquid crystal layer R3.

TABLE 3

| | Selective reflection layer | | |
|---|---|---|---|
| No. | Material | Selective reflection central wavelength (60°) | Film thickness |
| 101 | Low Δn liquid crystal | UV1 layer: 380 nm<br>B1 layer: 450 nm<br>G1 layer: 520 nm<br>R1 layer: 640 nm | UV1 layer: 4.0 μm<br>B1 layer: 4.1 μm<br>G1 layer: 3.9 μm<br>R1 layer: 4.1 μm |
| 102 | Low Δn liquid crystal | UV1 layer: 380 nm<br>B1 layer: 450 nm<br>G1 layer: 520 nm<br>R1 layer: 640 nm | UV1 layer: 4.0 μm<br>B1 layer: 4.1 μm<br>G1 layer: 4.2 μm<br>R1 layer: 4.3 μm |
| 103 | Low Δn liquid crystal | UV1 layer: 380 nm<br>B1 layer: 450 nm<br>G1 layer: 520 nm<br>R1 layer: 640 nm | UV1 layer: 3.0 μm<br>B1 layer: 3.5 μm<br>G1 layer: 4.0 μm<br>R1 layer: 4.5 μm |
| 104 | Low Δn liquid crystal | UV1 layer: 380 nm<br>B1 layer: 450 nm<br>G1 layer: 520 nm<br>R1 layer: 640 nm | UV1 layer: 3.0 μm<br>B1 layer: 3.5 μm<br>G1 layer: 4.0 μm<br>R1 layer: 4.5 μm |
| 105 | Dielectric multi-layer film formed of PEN and coPEN | UV2 layer: 380 nm<br>B2 layer: 450 nm<br>G2 layer: 520 nm<br>R2 layer: 640 nm | UV2 layer: 5.8 μm<br>B2 layer: 6.9 μm<br>G2 layer: 7.1 μm<br>R2 layer: 8.5 μm |
| 106 | Low Δn liquid crystal | B1 layer: 450 nm<br>G1 layer: 520 nm<br>R1 layer: 640 nm | B1 layer: 4.1 μm<br>G1 layer: 3.9 μm<br>R1 layer: 4.1 μm |
| c11 | Low Δn liquid crystal | UV3 layer: 380 nm<br>B3 layer: 450 nm<br>G3 layer: 530 nm<br>R3 layer: 610 nm | UV3 layer: 3.0 μm<br>B3 layer: 3.5 μm<br>G3 layer: 4.0 μm<br>R3 layer: 4.5 μm |

EXAMPLE 2

Design of Head-Up Display

Head-up displays Nos. 201 to 206 and c11 including the windshield glasses Nos. 101 to 106 and c21 produced as described above and a projector including a laser light source for forming a projection image were designed such that the second glass plate side of each windshield glass was a side on which light of the laser light source was incident.

Head-up display systems Nos. 201 to 206 are head-up display systems according to the embodiment of the present invention, and head-up display system No. c21 is a comparative head-up display system.

In addition, Table 4 below collectively shows the reflection properties of the selective reflection layer and the output power of each laser light source in each windshield glass, the relationship between the reflectivity of the selective reflection layer and the brightness of the laser beam in each head-up display system, and the evaluation results of the image tint and the reflection tint.

[Evaluation α] Measurement of Reflection Spectrum of Selective Reflection Layer

A black polyethylene terephthalate (PET) film (light absorber) was bonded to the rear surface of the produced windshield glass on the first glass plate side.

Using a spectrophotometer (V-670, manufactured by JASCO Corporation), P-polarized light and S-polarized light were respectively incident from the second glass plate of the windshield glass in a direction at a desired angle with respect to the normal direction of the windshield glass surface to measure reflection spectra of the P-polarized light and the S-polarized light in a band of wavelength of 300 to 800 nm. The average value (average reflection spectrum) of the measured reflection spectrum of P-polarized light and the measured reflection spectrum of S-polarized light was obtained. The graph shown in FIG. 6 is a reflection spectrum measured by incidence of light at an angle of 5° with respect to the normal direction of the surface of the windshield glass No. 101, and the graph shown in FIG. 7 is a reflection spectrum measured by incidence of light at an angle of 60° with respect to the normal direction of the surface of the windshield glass No. 101.

In the present invention, the selective reflection central wavelength (60°), the reflectivity (60°), and the half-width (60°) mean values calculated based on a reflection spectrum measured by incidence of light at an angle of 60° with respect to the normal direction of the windshield glass surface, and the selective reflection central wavelength (5°) means a value calculated based on a reflection spectrum measured by incidence of light at an angle of 5° with respect to the normal direction of the windshield glass surface.

The average value between the reflectivity in a case where the P-polarized light was incident and the reflectivity in a case where the S-polarized light was incident is synonymous with the reflectivity in a case where the non-polarized light (natural light) was incident. That is, the average value of the reflection spectrum of P-polarized light and the reflection spectrum of S-polarized light has the same meaning as the reflection spectrum in the case where the natural light was incident.

From the calculated average values of the reflection spectra of the P -polarized light and the S-polarized light, by the method described above, each selective reflection central wavelength λ and half-widths Δλ thereof in a band of wavelength of 400 nm or more and less than 500 nm, a band of wavelength of 500 nm or more and less than 600 nm, and a band of wavelength of 600 nm to 700 nm were calculated based on the two wavelengths which are the maximum value of the natural light reflectivity and the intermediate reflectivity between the greatest maximal value and the greatest minimal value of the natural light reflectivity, respectively. In addition, as the reflectivity at each selective reflection central wavelength λ, the value of the reflectivity at the selective reflection central wavelength λ in the average value of the calculated reflection spectra of P-polarized light and S-polarized light was used.

[Evaluation 1] Evaluation of Reflection Tint

Natural light was incident from the first glass plate side in a direction of 5° with respect to the normal direction of the first glass plate, and a reflectivity spectrum was measured from the normal direction of the first glass plate (observation position No. 5 in FIG. 5) using a spectrophotometer (V-670, manufactured by JASCO Corporation). According to Japanese Industrial Standards (JIS) R3106, a reflectivity was calculated by multiplying the reflectivity by a coefficient based on luminosity factor and an emission spectrum of the D65 light source in a wavelength range of 380 to 780 nm at intervals of 10 nm, and the reflection tints a* and b* were calculated from the spectra.

In addition, the same was applied to a case where the incidence angle of natural light was changed to a direction of 60° with respect to the normal direction of the first glass plate.

The reflection tint was evaluated based on the following evaluation standards. In the present test, in a case where the evaluation was "AA to B", the reflection tint was sufficiently suppressed, which is preferable. In the following Table 4, the evaluations described in the columns of 5° and 60° of the reflection tint correspond to the evaluations in the case where natural light is incident from the direction of 5° or 60° with respect to the normal direction of the first glass plate, respectively.

Evaluation Standards (Reflection Tint)

AA: |a*|≤3 and |b*|≤3, it looks white in a case of projecting the white color.

A: |a*|≤5 and |b*|≤5 (excluding those corresponding to the above AA), it looks almost white in a case of projecting the white color.

B: |a*|≤7 and |b*|≤7 (excluding those corresponding to AA or A), and it looks very slightly tinted in a case of projecting the white color.

[Evaluation 2] Evaluation of Image Tint

The output power of each color of the laser light source of the projector was adjusted to be a value described in the following Table 4, and a white image was projected from the projector from a direction of 60° with respect to the normal direction of the second glass plate. The tint of the screen image was measured using a luminance colorimeter BM-5A (trade name) manufactured by TOPCON CORPORATION, and evaluated according to the following evaluation standards.

Figure 5:
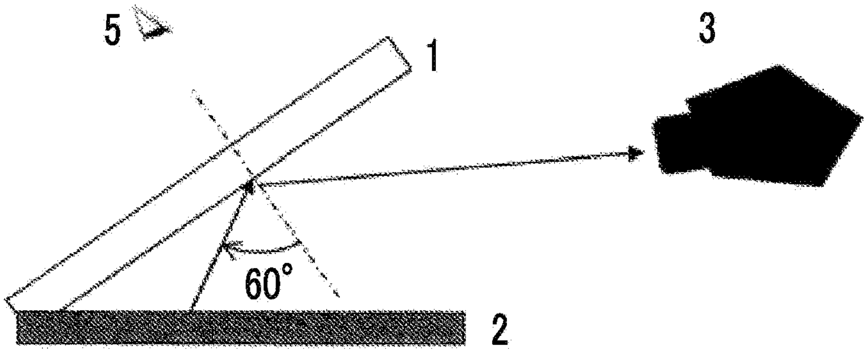
FIG. 5 is a schematic view showing the arrangement of a windshield glass, a liquid crystal panel, and a brightness meter in the evaluation of the image tint of the head-up display of Examples.

More specifically, the image tint was evaluated in the arrangement shown in FIG. 5. The produced windshield glass 1 was inclined such that the long side was horizontal and the short side was vertical and the second glass plate side was downward, a screen image was projected on the second glass plate from the projector 2 disposed on the second glass plate side, and the tint of the projected image was measured using the luminance colorimeter 3.

As the projector 2, a projector including an RGB light source module having laser light sources of blue light, green light, and red light and a MEMS mirror was used. A distance between the projector 2 and the windshield glass 1 was 500 mm. In the evaluation, p -polarized light, that is, linearly polarized light in which the electric vector vibration surface was parallel to the paper surface in FIG. 5 was used.

[Evaluation β] Measurement of Brightness of Laser Beam

Under the condition of the output power of the laser light source for [Evaluation 2] Evaluation of image tint, the brightness $L_B$, $L_G$, and $L_R$ of each color laser beam were measured as follows.

In $L_B$, the brightness of the projector 2 in a case where the output power of the blue laser light source was set to 49 mW was measured using a luminance colorimeter BM-5A (trade name) manufactured by TOPCON CORPORATION. Similarly for $L_G$ and $L_R$, the brightness under the conditions of the output power of the green and red laser light sources shown in Table 4 was measured using a luminance colorimeter BM-5A (trade name) manufactured by TOPCON CORPORATION.

$X_B$, $X_G$, and $X_R$ were calculated from the products of the brightnesses $L_B$, $L_G$, and $L_R$ of the laser beam and the reflectivities $R_B$, $R_G$, and $R_R$ of the selective reflection layer in the light emitted from the projector 2 respectively measured as described above, and $X_B/X_G$, $X_B/X_R$, and $X_G/X_R$ as the ratio thereof were calculated.

[Evaluation 3] Evaluation of Visible Light Transmittance

Natural light was incident from the first glass plate side in a direction of 0° with respect to the normal direction of the first glass plate, and a transmittance spectrum was measured from the normal direction of the second glass plate side using a spectrophotometer (V-670, manufactured by JASCO Corporation). According to JIS R 3106, the transmittance was calculated by multiplying the transmittance by each of a coefficient based on luminosity factor and an emission spectrum of an A light source in a wavelength range of 380 to 780 nm at intervals of 10 nm.

All of the windshield glasses Nos. 101 to 106 in the head-up display systems Nos. 201 to 206 according to the embodiment of the present invention had a transmittance of 80% or more, and this was a level at which the transmittance sufficiently exceeded 70% even in a case where the laminated glass was formed of green glass instead of the first glass plate and the second glass plate.

TABLE 4

| | | Reflection properties and output power of laser light source | | | | | | | | | | | | | | Evaluation | | |
|---|---|---|---|---|---|---|---|---|---|---|---|---|---|---|---|---|---|---|
| | | Selective reflection center wavelength (60°) | | | Reflectivity (60°) | | | | Output power of laser light source | | | | | | | Reflection tint | | |
| No. | Windshield glass No. | λB | λG | λR | RB | RG | RR | RB/RG | Adjustment of power | PB | PG | PR | XB/XG | XB/XR | XG/XR | 5° | 60° | Image tint |
| 201 | 101 | 450 | 520 | 640 | 44 | 39 | 38 | 1.13 | Done | 49 | 56 | 60 | 0.99 | 0.95 | 0.96 | AA | A | A |
| 202 | 102 | 450 | 520 | 640 | 44 | 42 | 40 | 1.05 | Done | 49 | 56 | 60 | 0.92 | 0.90 | 0.98 | A | A | A |
| 203 | 103 | 450 | 520 | 640 | 38 | 40 | 42 | 0.95 | Done | 49 | 49 | 49 | 0.95 | 0.90 | 0.95 | A | B | A |
| 204 | 104 | 450 | 520 | 640 | 38 | 40 | 42 | 0.95 | Done | 49 | 51 | 54 | 0.91 | 0.82 | 0.90 | A | B | B |
| 205 | 105 | 450 | 520 | 640 | 44 | 39 | 38 | 1.13 | Done | 49 | 56 | 60 | 0.99 | 0.95 | 0.96 | AA | A | A |
| 206 | 106 | 450 | 520 | 640 | 44 | 39 | 38 | 1.13 | Done | 49 | 56 | 60 | 0.99 | 0.95 | 0.96 | B | A | A |
| c21 | c11 | 450 | 530 | 610 | 38 | 40 | 42 | 0.95 | None | 49 | 59 | 93 | 0.79 | 0.48 | 0.60 | A | B | C |

In the present test, the evaluation of "AA to B" is an acceptable level.

Evaluation Standards (Image Tint)

AA: |a*|≤3 and |b*|≤3, and the screen image looks white.

A: |a*|≤5 and |b*|≤5 (excluding those corresponding to AA), and the screen image looks almost white.

B: |a*|≤7 and |b*|≤7 (excluding those corresponding to AA or A), and the screen image looks slightly tinted.

C: |a*|≤9 and |b*|≤9 (excluding those corresponding to any one of AA, A, and B), and the screen image looks tinted.

(Notes in Table)

The selective reflection wavelength (60°) means a selective reflection central wavelength (60°), a unit thereof is nm, a unit of reflectivity (60°) is %, and a unit of power of a laser light source is mW.

PB, PG, and PR mean the output power of the blue laser beam, the output power of the green laser beam, and the output power of the red laser beam, respectively.

RB/R G indicates a ratio of the reflectivity, and indicates a ratio of a value on the left side of "/" to a value on the right side of "/".

XB/XG in the table corresponds to $X_B/X_G$ in the regulation (a), XB/XR in the table corresponds to $X_B/X_R$ in the regulation (b), and XG/XR in the table corresponds to $X_G/X_R$ in the regulation (c). From the results in Table 4, the following facts can be seen.

In a comparative head-up display system No. c21 in which the selective reflection layer in the windshield glass and the laser light source for forming the projection image did not satisfy the regulations (a) to (c), the projected screen image was seen to be tinted (evaluation of image tint "C"), which was inferior.

On the other hand, in the head-up display systems Nos. 201 to 206 according to the embodiment of the present invention satisfying the regulations (a) to (c), the projected screen image had almost no tint and had a tint close to neutral (evaluation of the image tint "A" to "B"), and exhibited an excellent image tint.

In addition, in the head-up display systems Nos. 201 to 206 according to the embodiment of the present invention, the reflection tint itself from the appearance also exhibited high transparency as the same level as or higher than that of the comparative head-up display system No. c21.

The present invention has been described with the embodiments thereof, any details of the description of the present invention are not limited unless described otherwise, and it is obvious that the present invention is widely construed without departing from the gist and scope of the present invention described in the accompanying claims.

EXPLANATION OF REFERENCES

1: windshield glass
2: projector
3: luminance colorimeter
5: observation position
10: reflection film
10A: linearly polarized light reflection film
10B: linearly polarized light reflection film
11: selective reflection layer
12: cholesteric liquid crystal layer
12R: cholesteric liquid crystal layer having selective reflection central wavelengths $\lambda_R$ at light incidence angle of 60°
12G: cholesteric liquid crystal layer having selective reflection central wavelengths $\lambda_G$ at light incidence angle of 60°
12B: cholesteric liquid crystal layer having selective reflection central wavelengths $\lambda_B$ at light incidence angle of 60°
13R: first laminated portion having selective reflection central wavelengths $\lambda_R$ at light incidence angle of 60°
13G: second laminated portion having selective reflection central wavelengths $\lambda_G$ at light incidence angle of 60°
13B: third laminated portion having selective reflection central wavelengths $\lambda_B$ at light incidence angle of 60°
13Ra, 13Ga, 13Ba: optically anisotropic layer
13Rb, 13Gb, 13Bb: optically isotropic layer
14: polarization conversion layer
16: retardation layer
18: transparent substrate
20: head-up display system (HUD system)
22: projector
24, 24A, 24B: windshield glass
28: second glass plate
30: first glass plate
36: interlayer film
38: adhesive layer (heat seal layer)
D: driver
$n_{e1}$: refractive index of optically anisotropic layer in slow axis direction
$n_{o1}$: refractive index of optically anisotropic layer in direction orthogonal to slow axis direction
$n_{o2}$: refractive index of optically isotropic layer
Y: vertical direction

What is claimed is:

1. A head-up display system comprising:
a windshield glass having a selective reflection layer; and
a projector including a laser light source for forming a projection image on the windshield glass,
wherein the selective reflection layer includes three wavelengths of $\lambda_B$, $\lambda_G$, and $\lambda_R$ as selective reflection central wavelengths at a light incidence angle of 60°, $$400\ \text{nm} \le \lambda_B < 500\ \text{nm}$$

$$500\ \text{nm} \le \lambda_G < 600\ \text{nm}$$

$$600\ \text{nm} \le \lambda_R < 700\ \text{nm}$$

the laser light source emits laser beam of three colors of blue light, green light, and red light, and
all of the following regulations (a) to (c) are satisfied,
regulation (a) $0.80 \le X_B/X_G \le 1.20$
regulation (b) $0.80 \le X_B/X_R \le 1.20$
regulation (c) $0.80 \le X_G/X_R \le 1.20$
in the regulations, $X_B=R_B \times L_B$, $X_G=R_G \times L_G$, and $X_R=R_R \times L_R$,
$R_B$ indicates a natural light reflectivity of the selective reflection layer at $\lambda_B$,
$R_G$ indicates a natural light reflectivity of the selective reflection layer at $\lambda_G$, and
$R_R$ indicates a natural light reflectivity of the selective reflection layer at $\lambda_R$, and
$L_B$ represents brightness of blue laser beam in light emitted from the projector,
$L_G$ represents brightness of green laser beam in the light emitted from the projector, and
$L_R$ represents brightness of red laser beam in the light emitted from the projector.

2. The head-up display system according to claim 1,
wherein all of the following regulations (a1) to (c1) are satisfied,
regulation (a1) $0.90 \le X_B/X_G \le 1.10$
regulation (b1) $0.90 \le X_B/X_R \le 1.10$
regulation (c1) $0.90 \le X_G/X_R \le 1.10$
in the regulations, $X_B$, $X_G$, and $X_R$ have the same meanings as $X_B$, $X_G$, and $X_R$ described above.

3. The head-up display system according to claim 1,
wherein the natural light reflectivities $R_B$, $R_G$, and $R_R$ of the selective reflection layer satisfy a relationship of $R_B > R_G \ge R_R$.

4. The head-up display system according to claim 1,
wherein the natural light reflectivities $R_B$ and $R_G$ of the selective reflection layer satisfy a relationship of $R_B/R_G \ge 1.10$.

5. The head-up display system according to claim 1,
wherein in the selective reflection layer, all of the selective reflection central wavelengths $\lambda_B$, $\lambda_G$, and $\lambda_R$ at the light incidence angle of 60° have a half-width of 100 nm or less, and all of the natural light reflectivities $R_B$, $R_G$, and $R_R$ are 25% or more.

6. The head-up display system according to claim 2,
wherein in the selective reflection layer, all of the selective reflection central wavelengths $\lambda_B$, $\lambda_G$, and $\lambda_R$ at the light incidence angle of 60° have a half-width of 100 nm or less, and wherein all of the natural light reflectivities $R_B$, $R_G$, and $R_R$ of the selective reflection layer are 25% or more, the natural light reflectivities $R_B$, $R_G$, and $R_R$ of the selective reflection layer satisfy a relationship of $R_B > R_G \geq R_R$, and the natural light reflectivities $R_B$ and $R_G$ of the selective reflection layer satisfy a relationship of $R_B/R_G \geq 1.10$.

7. The head-up display system according to claim 1, wherein the windshield glass includes at least one polarization conversion layer.

8. The head-up display system according to claim 1, wherein the selective reflection layer consists of a cholesteric liquid crystal.

9. The head-up display system according to claim 1, wherein the selective reflection layer is formed by laminating an optically anisotropic layer and an optically isotropic layer.

10. A transportation machine comprising:
the head-up display system according to claim 1.

* * * * *